United States Patent
Xia et al.

(10) Patent No.: US 11,582,053 B2
(45) Date of Patent: Feb. 14, 2023

(54) DATA MULTICAST IMPLEMENTATION METHOD, APPARATUS, AND SYSTEM

(71) Applicant: HUAWEI TECHNOLOGIES CO., LTD., Shenzhen (CN)

(72) Inventors: Nu Xia, Nanjing (CN); Gang Chen, Beijing (CN); Hongbo Zhao, Nanjing (CN); Boyuan Yu, Nanjing (CN); Mingli Zhang, Nanjing (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 101 days.

(21) Appl. No.: 17/137,398

(22) Filed: Dec. 30, 2020

(65) Prior Publication Data

US 2021/0119814 A1    Apr. 22, 2021

Related U.S. Application Data

(63) Continuation of application No. PCT/CN2019/093625, filed on Jun. 28, 2019.

(30) Foreign Application Priority Data

Jun. 30, 2018 (CN) .......................... 201810703770.0

(51) Int. Cl.
*H04L 12/28* (2006.01)
*H04L 12/18* (2006.01)
(Continued)

(52) U.S. Cl.
CPC ............ *H04L 12/185* (2013.01); *H04L 45/16* (2013.01); *H04L 45/22* (2013.01); *H04L 45/28* (2013.01)

(58) Field of Classification Search
USPC ....................................................... 370/390
See application file for complete search history.

(56) References Cited

U.S. PATENT DOCUMENTS 10,237,206 B1 *   3/2019   Agrawal ................. H04L 45/38
10,404,619 B1 *   9/2019   Agrawal ................. H04L 45/38
(Continued)

FOREIGN PATENT DOCUMENTS

CN          1412985 A       4/2003
CN          1643848 A       7/2005
(Continued)

OTHER PUBLICATIONS

Haseeb Khalid et al: "WECRR: Weighted Energy-Efficient Clustering with Robust Routing for Wireless Sensor Networks", Wireless Personal Communications, Springer, Dordrechtn L,vol. 97, No. 1 May 26, 2017 (May 26, 2017), pp. 695-721 XP036343237, ISSN:0929-6212, DOI: 10.1007/S 11277-017-4532-5, total: 27 pages.
(Continued)

*Primary Examiner* — Chuong T Ho

(57) ABSTRACT

A data multicast implementation method, apparatus, and system are provided. In some embodiments, a transmission device receives a standby forwarding path establishment request, where the standby forwarding path establishment request includes a device identifier, has a destination address being an address of a multicast source device, and is used to request to establish a standby forwarding path between a multicast destination device identified by the device identifier and the multicast source device. In those embodiments, when determining, based on the device identifier in the standby forwarding path establishment request, that the transmission device is located on an active forwarding path between the multicast destination device and the multicast source device, the transmission device skips using the transmission device as a device on the standby forwarding path between the multicast destination device and the multicast source device, and skips forwarding the standby forwarding path establishment request.

20 Claims, 9 Drawing Sheets

(51) Int. Cl.
   *H04L 45/16*   (2022.01)
   *H04L 45/00*   (2022.01)
   *H04L 45/28*   (2022.01)

(56) References Cited

U.S. PATENT DOCUMENTS

| | | | |
|---|---|---|---|
| 2013/0121142 | A1 | 5/2013 | Bai et al. |
| 2016/0359723 | A1 | 12/2016 | Fan et al. |
| 2017/0013658 | A1* | 1/2017 | Ta ................... H04W 4/06 |
| 2019/0007225 | A1* | 1/2019 | Nagarajan ......... H04L 41/0213 |
| 2019/0132150 | A1* | 5/2019 | Ramachandran ... H04L 12/4633 |
| 2021/0306257 | A1* | 9/2021 | Dutta ................. H04L 45/20 |

FOREIGN PATENT DOCUMENTS

| | | | |
|---|---|---|---|
| CN | 1969491 | A | 5/2007 |
| CN | 101035057 | A | 9/2007 |
| CN | 101145930 | A | 3/2008 |
| CN | 102111845 | A | 6/2011 |
| CN | 102316016 | A | 1/2012 |
| CN | 102571401 | A | 7/2012 |
| CN | 102740394 | A | 10/2012 |
| CN | 103178976 | A | 6/2013 |
| CN | 103260211 | A | 8/2013 |
| CN | 103795626 | A | 5/2014 |
| CN | 106685822 | A | 5/2017 |
| EP | 1395003 | A2 | 3/2004 |
| EP | 3151489 | A1 | 4/2017 |
| JP | 2005094137 | A | 4/2005 |

OTHER PUBLICATIONS

Karan C Filsfils IJ Wijnands A et al: "Multicast only Fast Re-Route; draft-ietf-rtgwg-mofrr-08.txt", Multicast Only Fast Re-Route; Draft-IETF-RTGWG-MOFRR-08.txt, Internet Engineering Task Force, IETF; Standardworkingdraft, Internet Society (ISOC) 4, Rue des Falaises CH 1205 Geneva, Switzerland, May 18, 2015 (May 18, 2015), pp. 1-14, XP015106264, total: 14 pages.

Extended European Search Report issued in EP 19825646.3, dated Jul. 5, 2021, total 15 pages.

Office Action issued in CN 201810703770.0 dated Feb. 3, 2021, 11 pages.

International Search Report and Written Opinion issued in PCT/CN2019/093625, dated Sep. 27, 2019, 9 pages.

\* cited by examiner

CONT. FROM FIG. 2A-1

CONT. FROM FIG. 2A-1

CONT. FROM FIG. 2A-1

CONT. FROM FIG. 2A-1

S05. Determine, based on the device identifier in the standby forwarding path establishment request, whether the second transmission device has joined the active forwarding path between the first multicast destination device and the multicast source device; and if the second transmission device is located on the active forwarding path, skip using the second transmission device as a device on a standby forwarding path between the first multicast destination device and the multicast source device, and skip forwarding the standby forwarding path establishment request; or if the second transmission device is not located on the active forwarding path, use the second transmission device as a device on a standby forwarding path, and forward the standby forwarding path establishment request to a neighboring upstream device Standby forwarding path establishment request (device identifier)

S06. Use a port that is of the multicast source device and that is used to receive the standby forwarding path establishment request as a port used for the standby forwarding path

FIG. 2A-2

DATA MULTICAST IMPLEMENTATION METHOD, APPARATUS, AND SYSTEM

CROSS-REFERENCE TO RELATED APPLICATIONS

This application is a continuation of International Application No. PCT/CN2019/093625, filed on Jun. 28, 2019, which claims priority to Chinese Patent Application No. 201810703770.0, filed on Jun. 30, 2018. The disclosures of the aforementioned applications are hereby incorporated by reference in their entireties.

TECHNICAL FIELD

The present invention relates to the field of communications technologies, and in particular, to a data multicast implementation method, apparatus, and system.

BACKGROUND

A multicast technology effectively resolves a problem of single-point sending and multi-point receiving, and therefore, is widely applied to video services such as internet protocol television (IPTV).

On a multicast network, a multicast destination device sends a forwarding path establishment request to a multicast source device to establish a forwarding path between the multicast destination device and the multicast source device. Forwarding paths between the multicast source device and multicast destination devices form a multicast tree, the multicast source device is a root node of the multicast tree, and the multicast destination devices are leaf nodes of the multicast tree.

To avoid service performance deterioration caused by a fault, generally, an active forwarding path and a standby forwarding path are established between a multicast source device and a multicast destination device. Both the active forwarding path and the standby forwarding path can be used by the multicast source device to transmit multicast data to the multicast destination device.

According to the prior art, in a process of establishing the active forwarding path and the standby forwarding path, the multicast destination device sends, to a neighboring upstream device, a forwarding path establishment request used to establish the active forwarding path and a forwarding path establishment request used to establish the standby forwarding path, and the device receiving the forwarding path establishment requests adds the local device to to-be-established forwarding paths, and forwards the received forwarding path establishment requests to a neighboring upstream device until the forwarding path establishment requests reach the multicast source device.

When the active forwarding path and the standby forwarding path are established by using this method, if a fault occurs on a transmission device that belongs to both the active forwarding path and the standby forwarding path, the transmission device affects both the active forwarding path and the standby forwarding path, causing interruption of multicast data transmission.

SUMMARY

Embodiments of the present invention provide a data multicast implementation method, apparatus, and system, to improve reliability of multicast data transmission.

According to a first aspect, a data multicast implementation method is provided. The method includes: A transmission device receives a first standby forwarding path establishment request, where the first standby forwarding path establishment request includes a first device identifier, has a destination address being an address of a multicast source device, and is used to request to establish a standby forwarding path between a first multicast destination device identified by the first device identifier and the multicast source device. When determining, based on the first device identifier in the first standby forwarding path establishment request, that the transmission device is located on an active forwarding path between the first multicast destination device and the multicast source device, the transmission device does not use the transmission device as a device on the standby forwarding path between the first multicast destination device and the multicast source device, and does not forward the first standby forwarding path establishment request.

According to the method in the first aspect of the present invention, the transmission device determines, based on the device identifier in the first standby forwarding path establishment request, whether the transmission device has joined the active forwarding path between the multicast destination device identified by the device identifier and the multicast source device, and when the transmission device has joined the active forwarding path between the multicast destination device and the multicast source device, the transmission device does not use the transmission device as a device on the standby forwarding path between the multicast destination device and the multicast source device, and does not forward the first standby forwarding path establishment request. Therefore, when a fault occurs on the transmission device, the transmission device affects only the active forwarding path of the multicast destination device, but does not affect the standby forwarding path of the multicast destination device, thereby improving reliability of multicast data transmission.

Before the transmission device receives the first standby forwarding path establishment request, generally, the method further includes: The transmission device receives an active forwarding path establishment request, where the active forwarding path establishment request includes the first device identifier, has a destination address being the address of the multicast source device, and is used to initiate, to the multicast source device, a request of establishing the active forwarding path between the first multicast destination device and the multicast source device. The transmission device uses the transmission device as a device on the active forwarding path between the first multicast destination device and the multicast source device, records information used to indicate that the transmission device is located on the active forwarding path corresponding to the first device identifier, and sends the active forwarding path establishment request to a neighboring upstream device.

Correspondingly, the transmission device may specifically determine, based on the first device identifier in the first standby forwarding path establishment request and the information used to indicate that the transmission device is located on the active forwarding path corresponding to the first device identifier, that the transmission device is located on the active forwarding path between the first multicast destination device and the multicast source device.

According to this implementation, the transmission device can conveniently and quickly determine, by recording the device identifier when the active forwarding path is established, that the local device is located on the active forwarding path corresponding to the device identifier.

The transmission device may further receive a second standby forwarding path establishment request, where the second standby forwarding path establishment request includes a second device identifier, has a destination address being the address of the multicast source device, and is used to request to establish a standby forwarding path between a second multicast destination device identified by the second device identifier and the multicast source device. When determining, based on the second device identifier, that the transmission device is not located on an active forwarding path between the second multicast destination device and the multicast source device, the transmission device uses the transmission device as a device on the standby forwarding path between the second multicast destination device and the multicast source device, for example, uses a port that is of the transmission device and that is used to receive the second standby forwarding path establishment request as a port used for the standby forwarding path, and sends the second standby forwarding path establishment request to a neighboring upstream device.

According to this implementation, the transmission device joins the standby forwarding path of the second multicast destination device only when the transmission device has not joined the active forwarding path between the second multicast destination device and the multicast source device. Therefore, when a fault occurs on the active forwarding path between the second multicast destination device and the multicast source device, the transmission device is not affected, thereby reducing a probability that the standby forwarding path between the second multicast destination device and the multicast source device is affected, and further improving reliability of multicast data transmission.

After the standby forwarding path between the second multicast destination device and the multicast source device is established, the second multicast destination device may perform fault detection on the active forwarding path, and indicate to enable the standby forwarding path after detecting a fault, or the multicast source device may perform fault detection on the active forwarding path, and indicate to enable the standby forwarding path after detecting a fault.

In the solution in which the second multicast destination device instructs to enable the standby forwarding path, when receiving a notification message that is sent by the neighboring upstream device, that includes the second device identifier, and that is used to indicate that the standby forwarding path of the second multicast destination device is successfully established, the transmission device determines a port used to receive the notification message as an enabling/disabling port of the standby forwarding path corresponding to the second device identifier, and sends the notification message to a neighboring downstream device by using the port that is of the transmission device and that is used for the standby forwarding path corresponding to the second device identifier, where the enabling/disabling port of the standby forwarding path is used to send an enabling message used to indicate to enable the standby forwarding path between the second multicast destination device and the multicast source device and a disabling message used to indicate to disable the standby forwarding path of the second multicast destination device.

According to this implementation, the transmission device receives the notification message used to indicate that the standby forwarding path is successfully established, and after receiving the notification message, determines the port used to receive the notification message as the enabling/disabling port of the standby forwarding path. Therefore, it can be ensured that the neighboring upstream device corresponding to the enabling/disabling port of the standby forwarding path is located on the standby forwarding path corresponding to the second device identifier, thereby ensuring that the enabling message and the disabling message are accurately sent to an upstream device located on the standby forwarding path corresponding to the second device identifier.

After determining the enabling/disabling port of the standby forwarding path, when receiving the enabling message sent by the neighboring downstream device, the transmission device sends received multicast data based on the enabling message by using the port that is of the transmission device and that is used for the standby forwarding path between the second multicast destination device and the multicast source device. Further, the enabling message may also be sent to the neighboring upstream device by using the enabling/disabling port of the standby forwarding path corresponding to the second device identifier.

During one implementation, when receiving the enabling message, the transmission device may be located on a path being used by another multicast destination device (for example, located on an active forwarding path of another multicast destination device, and/or located on a standby forwarding path being used by another multicast destination device), or may not be located on a path being used by another multicast destination device. If the transmission device is located on a path being used by another multicast destination device, because multicast data to be sent by the transmission device to different multicast destination devices generally is the same, the transmission device may directly send the received multicast data to the second multicast destination device, and does not necessarily need to forward the enabling message to the neighboring upstream device.

To reduce a bandwidth waste, the transmission device may send the enabling message only when the transmission device is not located on a path being used by another multicast destination device, that is, the transmission device does not send the enabling message when the transmission device is located on a path being used by another multicast destination device.

Further, the transmission device may further receive the disabling message sent by the neighboring downstream device, where the disabling message includes the second device identifier. Correspondingly, the transmission device stops, based on the disabling message, sending the received multicast data by using the port that is of the transmission device and that is used for the standby forwarding path between the second multicast destination device and the multicast source device, and may further send the disabling message to the neighboring upstream device by using the enabling/disabling port of the standby forwarding path corresponding to the second device identifier.

During one implementation, when the transmission device receives the disabling message, a forwarding path being used may include only the standby forwarding path between the second multicast destination device and the multicast source device, and may further include a forwarding path between another multicast destination device and the multicast source device, where the forwarding path being used passes through the port that is of the transmission device and that is used for the standby forwarding path between the second multicast destination device and the multicast source device.

To avoid impact on multicast data transmission on a forwarding path between another multicast destination device and the multicast source device, specifically, when determining, based on the disabling message, that the forwarding path being used includes only the standby forwarding path between the second multicast destination device and the multicast source device, the transmission device may stop sending the received multicast data by using the port that is of the transmission device and that is used for the standby forwarding path between the second multicast destination device and the multicast source device, where the forwarding path being used passes through the port that is of the transmission device and that is used for the standby forwarding path between the second multicast destination device and the multicast source device.

In the solution in which the multicast source device indicates to enable the standby forwarding path, when receiving the enabling message that is sent by the neighboring upstream device and that is used to indicate to enable the standby forwarding path, the transmission device sends the enabling message by using the port that is of the transmission device and that is used for the standby forwarding path.

It should be noted that the port used for the standby forwarding path may be used only for the standby forwarding path, or may be used for both the standby forwarding path and the active forwarding path. When receiving the enabling message, the transmission device may further enable the port that is of the transmission device and that is used only for the standby forwarding path, to send the received multicast data.

In one implementation, the transmission device may send the enabling message by using all ports that are of the transmission device and that are used for standby forwarding paths. Correspondingly, if all the ports that are of the transmission device and that are used for the standby forwarding paths include a port used only for a standby forwarding path, the port used only for the standby forwarding path is further enabled to send the received multicast data. Further, when receiving a disabling message that is sent by the neighboring upstream device and that is used to indicate to disable the standby forwarding path, the transmission device stops sending the received multicast data by using the port used only for the standby forwarding path, and sends the disabling message by using all the ports that are of the transmission device and that are used for the standby forwarding paths. In this implementation, the standby forwarding path can be easily and conveniently enabled or disabled.

In another implementation, the enabling message may include a target device identifier. Correspondingly, the transmission device may send the enabling message only by using a port that is of the transmission device and that is used for a standby forwarding path corresponding to the target device identifier. Correspondingly, if the port that is of the transmission device and that is used for the standby forwarding path corresponding to the target device identifier includes a port used only for a standby forwarding path, the port used only for the standby forwarding path is further enabled to send the received multicast data. Further, when receiving a disabling message that is sent by the neighboring upstream device, that includes the target device identifier, and that is used to indicate to disable the standby forwarding path, the transmission device stops sending the received multicast data by using the port that is of the transmission device and that is used only for the standby forwarding path corresponding to the target device identifier, and sends the disabling message by using the port that is of the transmission device and that is used for the standby forwarding path.

According to this implementation, the port on the standby forwarding path corresponding to the target device identifier can be enabled in a targeted manner, to send the multicast data, thereby reducing occupation of a bandwidth.

According to a second aspect, a data multicast implementation method is provided. The method includes: A multicast destination device sends an active forwarding path establishment request to a first neighboring upstream device of the multicast destination device, where a destination address of the active forwarding path establishment request is an address of a multicast source device, to request to establish an active forwarding path between the multicast destination device and the multicast source device, the active forwarding path establishment request further includes a device identifier used to identify the multicast destination device, and the device identifier is used by a device to record information used to indicate that the device has joined the active forwarding path corresponding to the device identifier, where the device is located between the multicast source device and the multicast destination device and has joined the active forwarding path. The multicast destination device sends a standby forwarding path establishment request to a second neighboring upstream device of the multicast destination device different from the first neighboring upstream device, where a destination address of the standby forwarding path establishment request is the address of the multicast source device, to request to establish a standby forwarding path between the multicast destination device and the multicast source device, the standby forwarding path establishment request further includes the device identifier, where the device identifier is used by a transmission device that is located between the multicast source device and the multicast destination device and that has received the standby forwarding path establishment request to determine, based on the device identifier, whether the transmission device has joined the active forwarding path corresponding to the device identifier.

According to the implementation of the second aspect, because the active forwarding path establishment request and the standby forwarding path establishment request are respectively sent to different neighboring upstream devices, and both the active forwarding path establishment request and the standby forwarding path establishment request include the device identifier of the multicast destination device, it can be effectively avoided that a same transmission device is used for both the active forwarding path of the multicast destination device and the standby forwarding path of the multicast destination device, thereby improving reliability of multicast data transmission.

After sending the standby forwarding path establishment request, when receiving a notification message that is sent by the second neighboring upstream device and that is used to indicate that the standby forwarding path of the multicast destination device is successfully established, the multicast destination device may further determine a port used to receive the notification message as an enabling/disabling port of the standby forwarding path. Further, when detecting that a fault occurs on the active forwarding path, the multicast destination device sends, by using the enabling/disabling port of the standby forwarding path, an enabling message used to indicate to enable the standby forwarding path.

According to this implementation, the multicast destination device receives the notification message used to indicate that the standby forwarding path is successfully established, and after receiving the notification message, determines the port used to receive the notification message as the enabling/disabling port of the standby forwarding path. Therefore, it can be ensured that the neighboring upstream device corresponding to the enabling/disabling port of the standby forwarding path is located on the standby forwarding path between the multicast destination device and the multicast source device, thereby ensuring that the enabling message is accurately sent to the upstream device located on the standby forwarding path between the multicast destination device and the multicast source device.

According to a third aspect, a data multicast implementation method is provided. The method includes: A multicast source device receives an active forwarding path establishment request by using a first port, where the active forwarding path establishment request includes a device identifier, and is used to initiate, to the multicast source device, a request of establishing an active forwarding path between a multicast destination device identified by the device identifier and the multicast source device. The multicast source device uses the first port as a port used for the active forwarding path. The multicast source device receives a standby forwarding path establishment request by using a second port, where the standby forwarding path establishment request includes the device identifier, and is used to initiate, to the multicast source device, a request of establishing a standby forwarding path between the multicast destination device and the multicast source device. The multicast source device uses the second port as a port used for the standby forwarding path.

According to the implementation of the third aspect, the port that is of the multicast source device and that is used for the active forwarding path of the multicast destination device and the port that is used for the standby forwarding path of the multicast destination device are different ports. Therefore, when a fault occurs on the active forwarding path, multicast data may also be sent to the multicast destination device by using the port used for the standby forwarding path, thereby improving reliability of multicast data transmission.

Further, after detecting that a fault occurs on the active forwarding path passing through the first port, the multicast source device may send, through a port that is of the multicast source device and that is used for a standby forwarding path, an enabling message used to indicate to enable the standby forwarding path, where the port that is of the multicast source device and that is used for the standby forwarding path includes the second port; or the multicast source device may enable a port that is of the multicast source device and that is used only for a standby forwarding path, to send the multicast data.

In a possible implementation, after detecting that a fault occurs on the active forwarding path passing through the first port, the multicast source device may further determine a device identifier corresponding to a case in which the first port is used as an active port, and further, send the enabling message by using a port that is of the multicast source device and that is used for a standby forwarding path corresponding to the determined device identifier. According to this implementation, the port on the standby forwarding path corresponding to the determined device identifier can be enabled in a targeted manner, to send the multicast data, thereby reducing occupation of a bandwidth.

According to a fourth aspect, a transmission device for implementing data multicast is provided. The transmission device includes a communications unit and a processing unit. The communications unit is configured to receive a first standby forwarding path establishment request, where the first standby forwarding path establishment request includes a first device identifier, has a destination address being an address of a multicast source device, and is used to request to establish a standby forwarding path between a first multicast destination device identified by the first device identifier and the multicast source device. The processing unit is configured to: when determining, based on the first device identifier, that the transmission device is located on an active forwarding path between the first multicast destination device and the multicast source device, skip using the transmission device as a device on the standby forwarding path between the first multicast destination device and the multicast source device, and skip forwarding the first standby forwarding path establishment request.

According to the transmission device in the fourth aspect of the present invention, the transmission device determines, based on the device identifier in the first standby forwarding path establishment request, whether the transmission device has joined the active forwarding path between the multicast destination device identified by the device identifier and the multicast source device, and when the transmission device has joined the active forwarding path between the multicast destination device and the multicast source device, the transmission device does not use the transmission device as a device on the standby forwarding path between the multicast destination device and the multicast source device, and does not forward the first standby forwarding path establishment request. Therefore, when a fault occurs on the transmission device, the transmission device affects only the active forwarding path of the multicast destination device, but does not affect the standby forwarding path of the multicast destination device, thereby improving reliability of multicast data transmission.

Before receiving the first standby forwarding path establishment request, the communications unit is further configured to receive an active forwarding path establishment request, where the active forwarding path establishment request includes the first device identifier, has a destination address being the address of the multicast source device, and is used to initiate, to the multicast source device, a request of establishing the active forwarding path between the first multicast destination device and the multicast source device. The communications unit is further configured to use the transmission device as a device on the active forwarding path between the first multicast destination device and the multicast source device, record information used to indicate that the transmission device is located on the active forwarding path corresponding to the first device identifier, and send the active forwarding path establishment request to a neighboring upstream device by using the communications unit.

Correspondingly, that the processing unit is configured to determine, based on the first device identifier, that the transmission device is located on the active forwarding path between the first multicast destination device and the multicast source device includes: the processing unit is configured to determine, based on the first device identifier in the first standby forwarding path establishment request and the information used to indicate that the transmission device is located on the active forwarding path corresponding to the first device identifier, that the transmission device is located on the active forwarding path between the first multicast destination device and the multicast source device.

According to this implementation, the transmission device can conveniently and quickly determine, by recording the device identifier when the active forwarding path is established, that the local device is located on the active forwarding path corresponding to the device identifier.

The communications unit may be further configured to receive a second standby forwarding path establishment request, where the second standby forwarding path establishment request includes a second device identifier, has a destination address being the address of the multicast source device, and is used to request to establish a standby forwarding path between a second multicast destination device identified by the second device identifier and the multicast source device. The processing unit is further configured to: when determining, based on the second device identifier, that the transmission device is not located on an active forwarding path between the second multicast destination device and the multicast source device, use the transmission device as a device on the standby forwarding path between the second multicast destination device and the multicast source device, for example, use a port that is of the transmission device and that is used to receive the second standby forwarding path establishment request as a port used for the standby forwarding path, and send the second standby forwarding path establishment request to a neighboring upstream device by using the communications unit.

According to this implementation, the transmission device joins the standby forwarding path of the second multicast destination device only when the transmission device has not joined the active forwarding path between the second multicast destination device and the multicast source device. Therefore, when a fault occurs on the active forwarding path between the second multicast destination device and the multicast source device, the transmission device is not affected, thereby reducing a probability that the standby forwarding path between the second multicast destination device and the multicast source device is affected, and further improving reliability of multicast data transmission.

After the standby forwarding path between the second multicast destination device and the multicast source device is established, the second multicast destination device may perform fault detection on the active forwarding path, and indicate to enable the standby forwarding path after detecting a fault, or the multicast source device may perform fault detection on the active forwarding path, and indicate to enable the standby forwarding path after detecting a fault.

In the solution in which the second multicast destination device indicates to enable the standby forwarding path, the processing unit is further configured to: when receiving, by using the communications unit, a notification message that is sent by the neighboring upstream device, that includes the second device identifier, and that is used to indicate that the standby forwarding path of the second multicast destination device is successfully established, determine a port used to receive the notification message as an enabling/disabling port of the standby forwarding path corresponding to the second device identifier, and send, by using the communications unit, the notification message to a neighboring downstream device by using the port that is of the transmission device and that is used for the standby forwarding path corresponding to the second device identifier, where the enabling/disabling port of the standby forwarding path is used to send an enabling message used to indicate to enable the standby forwarding path between the second multicast destination device and the multicast source device and a disabling message used to indicate to disable the standby forwarding path of the second multicast destination device.

According to this implementation, the transmission device receives the notification message used to indicate that the standby forwarding path is successfully established, and after receiving the notification message, determines the port used to receive the notification message as the enabling/disabling port of the standby forwarding path. Therefore, it can be ensured that the neighboring upstream device corresponding to the enabling/disabling port of the standby forwarding path is located on the standby forwarding path corresponding to the second device identifier, thereby ensuring that the enabling message and the disabling message are accurately sent to an upstream device located on the standby forwarding path corresponding to the second device identifier.

After the enabling/disabling port of the standby forwarding path is determined, the communications unit is further configured to receive the enabling message sent by the neighboring downstream device, where the enabling message includes the second device identifier, and correspondingly, the processing unit is further configured to send, by using the communications unit, received multicast data based on the enabling message by using the port that is of the transmission device and that is used for the standby forwarding path between the second multicast destination device and the multicast source device, and send, by using the communications unit, the enabling message to the neighboring upstream device by using the enabling/disabling port of the standby forwarding path corresponding to the second device identifier.

During one implementation, when receiving the enabling message, the transmission device may be located on a path being used by another multicast destination device (for example, located on an active forwarding path of another multicast destination device, and/or located on a standby forwarding path being used by another multicast destination device), or may not be located on a path being used by another multicast destination device. If the transmission device is located on a path being used by another multicast destination device, because multicast data to be sent by the transmission device to different multicast destination devices generally is the same, the transmission device may directly send the received multicast data to the second multicast destination device, and does not necessarily need to forward the enabling message to the neighboring upstream device.

To reduce a bandwidth waste, the processing unit may send, by using the communications unit, the enabling message only when the transmission device is not located on a path being used by another multicast destination device, that is, does not send, by using the communications unit, the enabling message when the transmission device is located on a path being used by another multicast destination device.

Further, the communications unit may further receive the disabling message sent by the neighboring downstream device, where the disabling message includes the second device identifier, and correspondingly, the processing unit stops, based on the disabling message, sending the received multicast data by using the communications unit and by using the port that is of the transmission device and that is used for the standby forwarding path between the second multicast destination device and the multicast source device, and may further send, by using the communications unit, the disabling message to the neighboring upstream device by using the enabling/disabling port of the standby forwarding path corresponding to the second device identifier.

During one implementation, when the communications unit receives the disabling message, a forwarding path being used may include only the standby forwarding path between the second multicast destination device and the multicast source device, and may further include a forwarding path between another multicast destination device and the multicast source device, where the forwarding path being used passes through the port that is of the transmission device and that is used for the standby forwarding path between the second multicast destination device and the multicast source device.

To avoid impact on multicast data transmission on a forwarding path between another multicast destination device and the multicast source device, specifically, when determining, based on the disabling message, that the forwarding path being used includes only the standby forwarding path between the second multicast destination device and the multicast source device, where the forwarding path being used passes through the port that is of the transmission device and that is used for the standby forwarding path between the second multicast destination device and the multicast source device, the processing unit may stop sending the received multicast data by using the communications unit and by using the port that is of the transmission device and that is used for the standby forwarding path between the second multicast destination device and the multicast source device.

In the solution in which the multicast source device indicates to enable the standby forwarding path, the processing unit is further configured to: when receiving, by using the communications unit, the enabling message that is sent by the neighboring upstream device and that is used to indicate to enable the standby forwarding path, send, by using the communications unit, the enabling message by using the port that is of the transmission device and that is used for the standby forwarding path.

It should be noted that the port used for the standby forwarding path may be used only for the standby forwarding path, or may be used for both the standby forwarding path and the active forwarding path. When receiving the enabling message, the processing unit may further enable a port that is of the transmission device and that is used only for the standby forwarding path, to send the received multicast data.

In one implementation, the processing unit may send, by using the communications unit, the enabling message by using all ports that are of the transmission device and that are used for standby forwarding paths. Correspondingly, if all the ports that are of the transmission device and that are used for the standby forwarding paths include a port used only for a standby forwarding path, the port used only for the standby forwarding path is further enabled to send the received multicast data. Further, when receiving, by using the communications unit, the disabling message that is sent by the neighboring upstream device and that is used to indicate to disable the standby forwarding path, the processing unit stops sending the received multicast data by using the communications unit and by using the port used only for the standby forwarding path, and sends, by using the communications unit, the disabling message by using all the ports that are of the transmission device and that are used for the standby forwarding paths. In this implementation, the standby forwarding path can be easily and conveniently enabled or disabled.

In another implementation, the enabling message may include a target device identifier. Correspondingly, the processing unit may send, by using the communications unit, the enabling message only by using a port that is of the transmission device and that is used for a standby forwarding path corresponding to the target device identifier. Correspondingly, if the port that is of the transmission device and that is used for the standby forwarding path corresponding to the target device identifier includes a port used only for a standby forwarding path, the port used only for the standby forwarding path is further enabled to send the received multicast data. Further, when receiving, by using the communications unit, a disabling message that is sent by the neighboring upstream device, that includes the target device identifier, and that is used to indicate to disable the standby forwarding path, the processing unit stops sending the received multicast data by using the port that is of the transmission device and that is used only for the standby forwarding path corresponding to the target device identifier, and sends, by using the communications unit, the disabling message by using the port that is of the transmission device and that is used for the standby forwarding path.

According to this implementation, the port on the standby forwarding path corresponding to the target device identifier can be enabled in a targeted manner, to send the multicast data, thereby reducing occupation of a bandwidth.

According to a fifth aspect, a multicast destination device for implementing data multicast is provided. The multicast destination device includes a communications unit and a processing unit. The processing unit is configured to send, by using the communications unit, an active forwarding path establishment request to a first neighboring upstream device of the multicast destination device, where a destination address of the active forwarding path establishment request is an address of a multicast source device, to request to establish an active forwarding path between the multicast destination device and the multicast source device, the active forwarding path establishment request further includes a device identifier used to identify the multicast destination device, and the device identifier is used by a device to record information used to indicate that the device has joined the active forwarding path corresponding to the device identifier, where the device is located between the multicast source device and the multicast destination device and has joined the active forwarding path. The processing unit is further configured to send, by using the communications unit, a standby forwarding path establishment request to a second neighboring upstream device of the multicast destination device different from the first neighboring upstream device, where a destination address of the standby forwarding path establishment request is the address of the multicast source device, to request to establish a standby forwarding path between the multicast destination device and the multicast source device, the standby forwarding path establishment request further includes the device identifier, and the device identifier is used by a transmission device that is located between the multicast source device and the multicast destination device and that has received the standby forwarding path establishment request to determine, based on the device identifier, whether the transmission device has joined the active forwarding path corresponding to the device identifier.

According to the implementation of the fifth aspect, because the active forwarding path establishment request and the standby forwarding path establishment request are respectively sent to different neighboring upstream devices, and both the active forwarding path establishment request and the standby forwarding path establishment request include the device identifier of the multicast destination device, it can be effectively avoided that a same transmission device is located on both the active forwarding path of the multicast destination device and the standby forwarding path of the multicast destination device, thereby improving reliability of multicast data transmission.

After sending the standby forwarding path establishment request, the processing unit is further configured to: when receiving, by using the communications unit, a notification message that is sent by the second neighboring upstream device and that is used to indicate that the standby forwarding path of the multicast destination device is successfully established, determine a port used to receive the notification message as an enabling/disabling port of the standby forwarding path. Further, when detecting that a fault occurs on the active forwarding path, the processing unit is further configured to send, by using the communications unit and by using the enabling/disabling port of the standby forwarding path, an enabling message used to indicate to enable the standby forwarding path.

According to this implementation, the multicast destination device receives the notification message used to indicate that the standby forwarding path is successfully established, and after receiving the notification message, determines the port used to receive the notification message as the enabling/disabling port of the standby forwarding path. Therefore, it can be ensured that the neighboring upstream device corresponding to the enabling/disabling port of the standby forwarding path is located on the standby forwarding path between the multicast destination device and the multicast source device, thereby ensuring that the enabling message is accurately sent to the upstream device located on the standby forwarding path between the multicast destination device and the multicast source device.

According to a sixth aspect, a multicast source device for implementing data multicast is provided. The multicast source device includes a communications unit and a processing unit. The communications unit is configured to receive an active forwarding path establishment request by using a first port, and receive a standby forwarding path establishment request by using a second port, where the active forwarding path establishment request includes a device identifier and is used to request, to the multicast source device, a request of establishing an active forwarding path between a multicast destination device identified by the device identifier and the multicast source device, and the standby forwarding path establishment request includes the device identifier and is used to initiate, to the multicast source device, a request of establishing a standby forwarding path between the multicast destination device and the multicast source device. The processing unit is configured to use the first port as a port used for the active forwarding path, and use the second port as a port used for the standby forwarding path.

According to the implementation of the sixth aspect, the port that is of the multicast source device and that is used for the active forwarding path of the multicast destination device and the port that is used for the standby forwarding path of the multicast destination device are different ports. Therefore, when a fault occurs on the active forwarding path, multicast data may also be sent to the multicast destination device by using the port used for the standby forwarding path, thereby improving reliability of multicast data transmission.

Further, the processing unit is further configured to: after detecting that a fault occurs on the active forwarding path passing through the first port, send, through the communications unit and through a port that is of the multicast source device and that is used for a standby forwarding path, an enabling message used to indicate to enable the standby forwarding path, where the port that is of the multicast source device and that is used for the standby forwarding path includes the second port; or enable a port that is of the multicast source device and that is used only for a standby forwarding path, to send the multicast data.

In a possible implementation, after detecting that a fault occurs on the active forwarding path passing through the first port, the processing unit may further determine a device identifier corresponding to a case in which the first port is used as an active port, and further, send, by using the communications unit, an enabling message only by using a port that is of the multicast source device and that is used for a standby forwarding path corresponding to the determined device identifier. According to this implementation, the port on the standby forwarding path corresponding to the determined device identifier can be enabled in a targeted manner, to send the multicast data, thereby reducing occupation of a bandwidth.

According to a seventh aspect, a data multicast implementation system is provided. The system includes a first multicast destination device and a transmission device. The first multicast destination device is configured to send a first standby forwarding path establishment request to a neighboring upstream device of the first multicast destination device, where a destination address of the first standby forwarding path establishment request is an address of a multicast source device, to request to establish a standby forwarding path between the first multicast destination device and the multicast source device, and the first standby forwarding path establishment request further includes a device identifier used to identify the first multicast destination device. The transmission device is configured to receive the first standby forwarding path establishment request, and when determining, based on the device identifier in the first standby forwarding path establishment request, that the transmission device is located on an active forwarding path between the first multicast destination device and the multicast source device, skip using the transmission device as a device on the standby forwarding path between the first multicast destination device and the multicast source device, and skip forwarding the first standby forwarding path establishment request.

According to an eighth aspect, a transmission device for implementing data multicast is provided. The transmission device includes a processor and a port. The processor is configured to receive a first standby forwarding path establishment request by using the port, where the first standby forwarding path establishment request includes a first device identifier, has a destination address being an address of a multicast source device, and is used to request to establish a standby forwarding path between a first multicast destination device identified by the first device identifier and the multicast source device. The processor is further configured to: when determining, based on the first device identifier, that the transmission device is located on an active forwarding path between the first multicast destination device and the multicast source device, skip using the transmission device as a device on the standby forwarding path between the first multicast destination device and the multicast source device, and skip forwarding the first standby forwarding path establishment request by using the communications unit. The processor is specifically configured to perform the method in the first aspect.

According to a ninth aspect, a multicast destination device for implementing data multicast is provided. The multicast destination device includes a processor and a port. The processor is configured to send an active forwarding path establishment request to a first neighboring upstream device of the multicast destination device by using a port used to communicate with the first neighboring upstream device, where a destination address of the active forwarding path establishment request is an address of a multicast source device, to request to establish an active forwarding path between the multicast destination device and the multicast source device, the active forwarding path establishment request further includes a device identifier used to identify the multicast destination device, and the device identifier is used by a device to record information used to indicate that the device has joined the active forwarding path corresponding to the device identifier, where the device is located between the multicast source device and the multicast destination device and has joined the active forwarding path. The processor is further configured to send a standby forwarding path establishment request to a second neighboring upstream device of the multicast destination device by using a port used to communicate with the second neighboring upstream device, where the second neighboring upstream device is different from the first neighboring upstream device, a destination address of the standby forwarding path establishment request is the address of the multicast source device, to request to establish a standby forwarding path between the multicast destination device and the multicast source device, the standby forwarding path establishment request further includes the device identifier, and the device identifier is used by a transmission device to that is located between the multicast source device and the multicast destination device and that has received the standby forwarding path establishment request determine, based on the device identifier, whether the transmission device has joined the active forwarding path corresponding to the device identifier.

According to a tenth aspect, a multicast source device for implementing data multicast is provided. The multicast source device includes a processor and a port. The processor is configured to receive an active forwarding path establishment request by using a first port, and receive a standby forwarding path establishment request by using a second port, where the active forwarding path establishment request includes a device identifier and is used to initiate, to the multicast source device, a request of establishing an active forwarding path between a multicast destination device identified by the device identifier and the multicast source device, and the standby forwarding path establishment request includes the device identifier and is used to initiate, to the multicast source device, a request of establishing a standby forwarding path between the multicast destination device and the multicast source device. The processing unit is configured to use the first port as a port used for the active forwarding path, and use the second port as a port used for the standby forwarding path. The processor is specifically configured to perform the method in the third aspect.

Still another aspect of this application provides a computer readable storage medium. The computer readable storage medium stores an instruction, and when the instruction is run on a computer, the computer is enabled to perform the methods in the foregoing aspects.

Still another aspect of this application provides a computer program product including an instruction. When the computer program product is run on a computer, the computer is enabled to perform the methods in the foregoing aspects.

BRIEF DESCRIPTION OF DRAWINGS

To describe the technical solutions in the embodiments of the present invention more clearly, the following briefly describes the accompanying drawings for describing the embodiments or the prior art.

FIG. 2A-1 to FIG. 2C are schematic flowcharts of a method according to an embodiment of the present invention;

DESCRIPTION OF EMBODIMENTS

The following describes the technical solutions in the embodiments of the present invention with reference to the accompanying drawings in the embodiments of the present invention.

Figure 1:
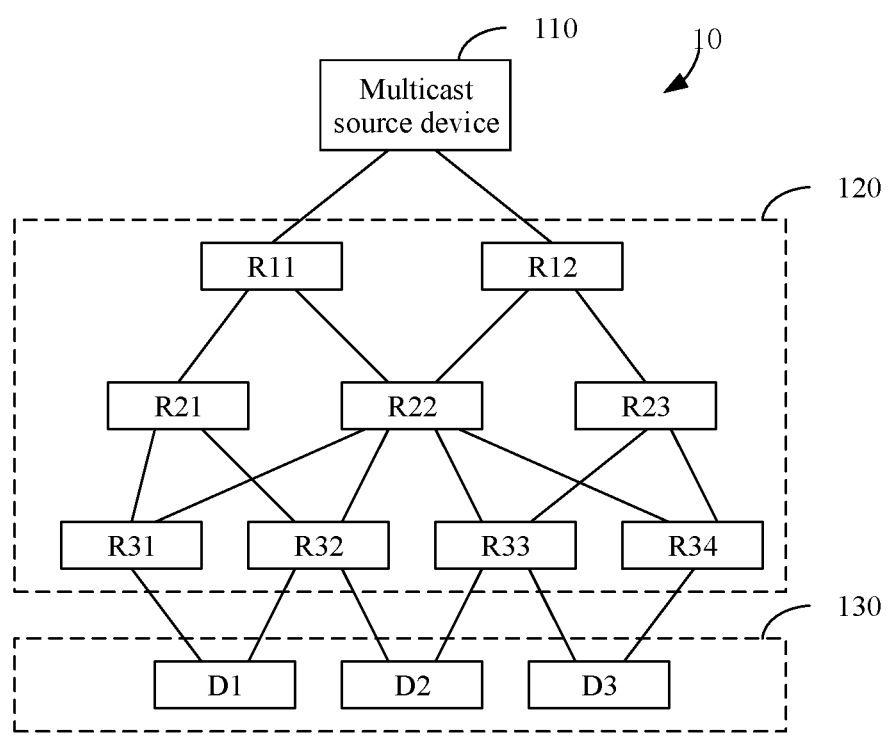
FIG. 1 is a schematic networking structural diagram of a system according to an embodiment of the present invention.

FIG. 1 is a schematic networking structural diagram of a data multicast implementation system 100 according to an embodiment of the present invention. The system 10 includes a multicast source device 110, a plurality of transmission devices 120 (for example, R11 to R34 shown in FIG. 1), and a plurality of multicast destination devices 130 (for example, D1 to D3 shown in FIG. 1). The multicast source device 110 may be a rendezvous point (RP) device, the transmission device 120 may be a switch, a router, or the like, and the multicast destination device 130 may be a designated router (DR).

The multicast source device 110, the transmission devices 120, and the multicast destination devices 130 generally are located on a same metropolitan area network. As shown in FIG. 1, each multicast destination device 130 is connected to at least two neighboring upstream devices, each transmission device 120 is connected to at least one neighboring upstream device and at least one neighboring downstream device, and the multicast source device 110 is connected to at least two neighboring downstream devices.

The multicast source device 110 obtains, from a data source device, data to be multicast to the multicast destination devices 130, and sends the multicast data to the multicast destination devices 130 by using the transmission devices 120. Each multicast destination device 130 is configured to send the received multicast data to a customer edge (CE) device connected to the multicast destination device 130, and further, the CE sends the received multicast data to each customer terminal connected to the CE.

The system 10 may be an IPTV system. In the IPTV system, the multicast source device 110 may be specifically a core router (CR), the transmission device 120 may be a border router (BR), and the multicast destination device 130 may be a broadband remote access server (BRAS). Correspondingly, the data source device connected to the CR may be an IPTV server, the CE connected to the BRAS may be an optical line terminal (OLT), and the customer terminal connected to the CE may be a set top box.

For any one of the multicast destination devices 130, an active forwarding path and a standby forwarding path between the multicast destination device and the multicast source device are established. Correspondingly, the multicast source device 110 sends the multicast data to the multicast destination device by using the active forwarding path, and when a fault occurs on the active forwarding path, sends the multicast data to the multicast destination device by using the standby forwarding path.

Figures 1, 2A:
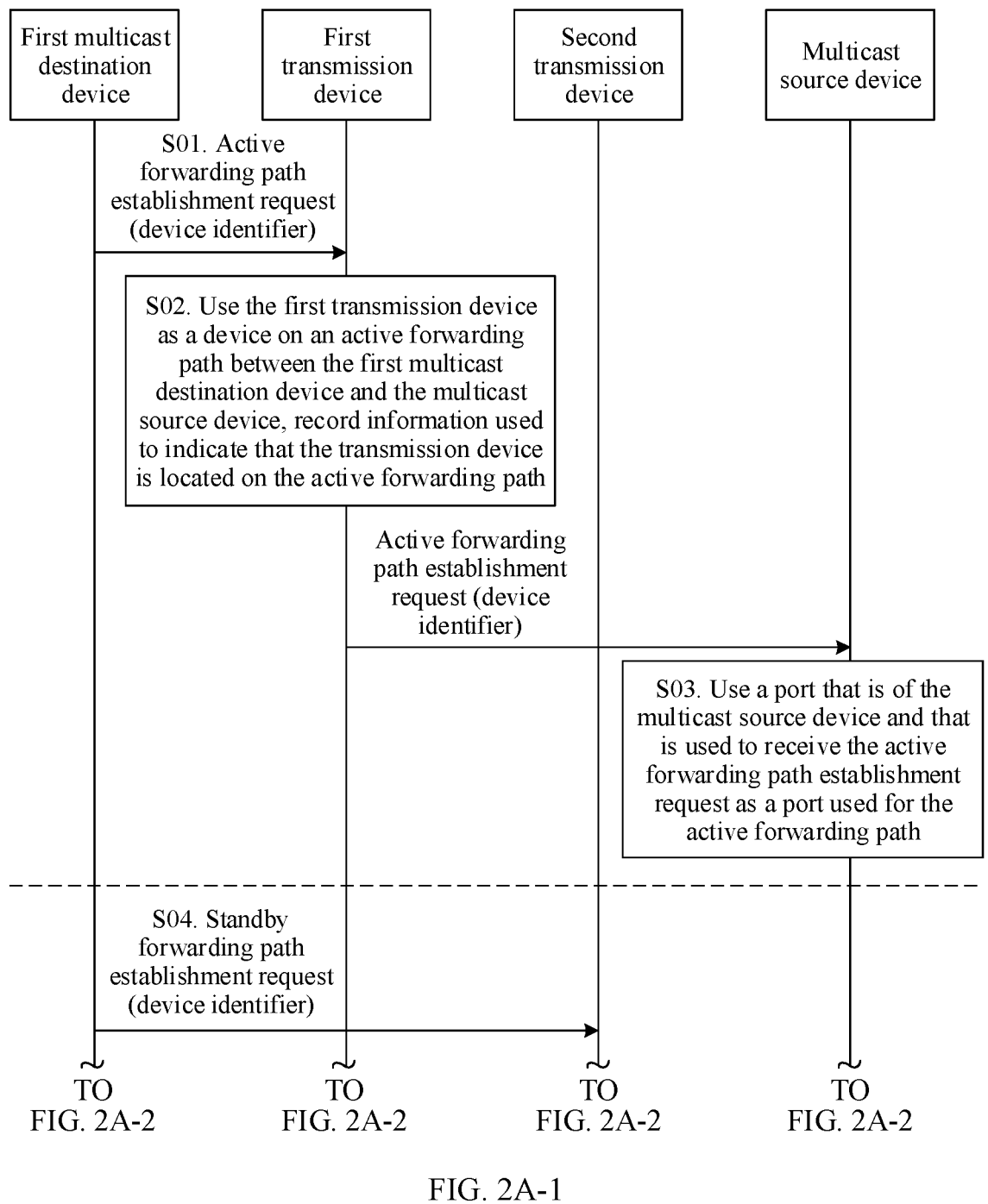
Figures 1, 2B:
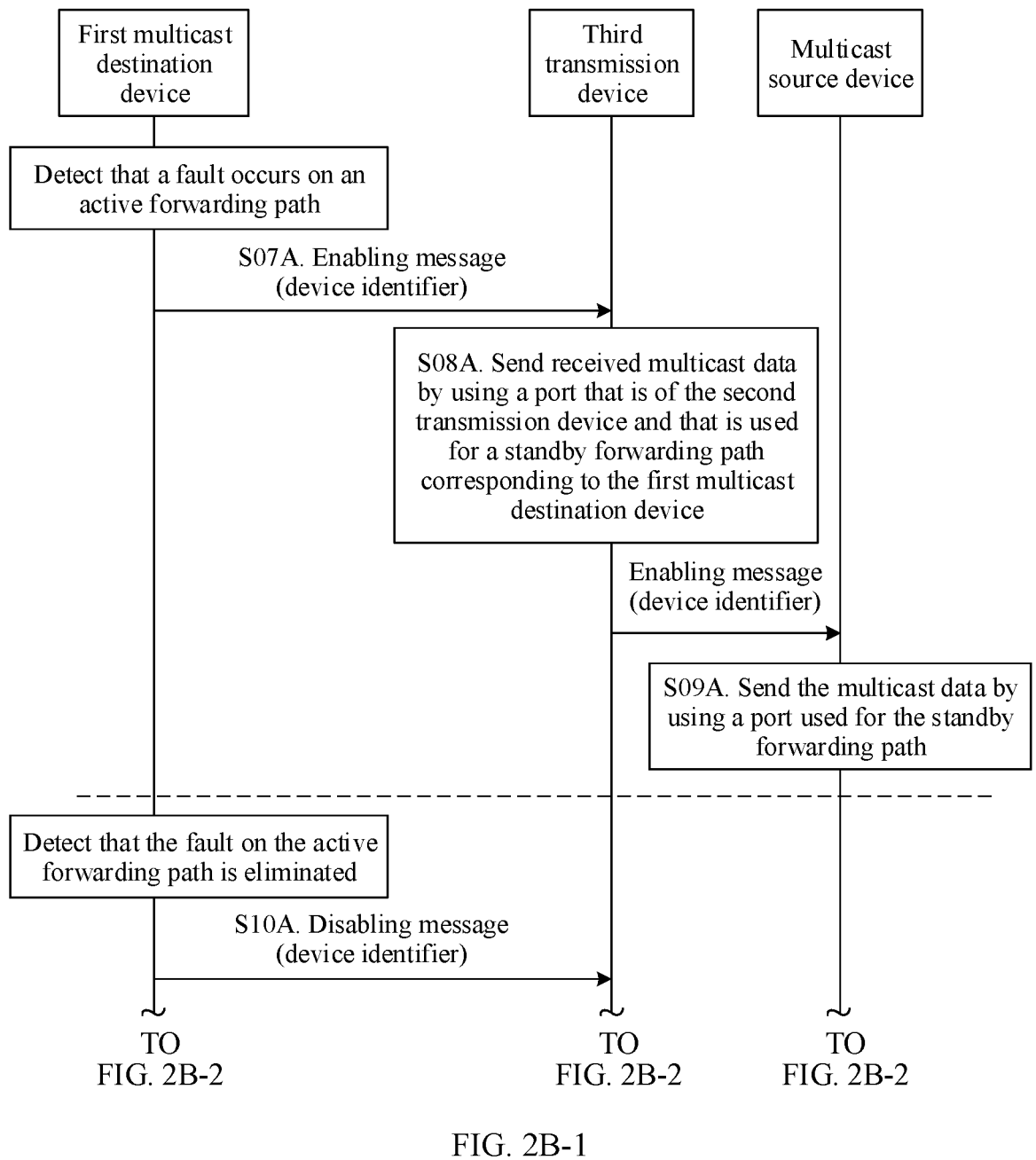
Figures 2, 2B:
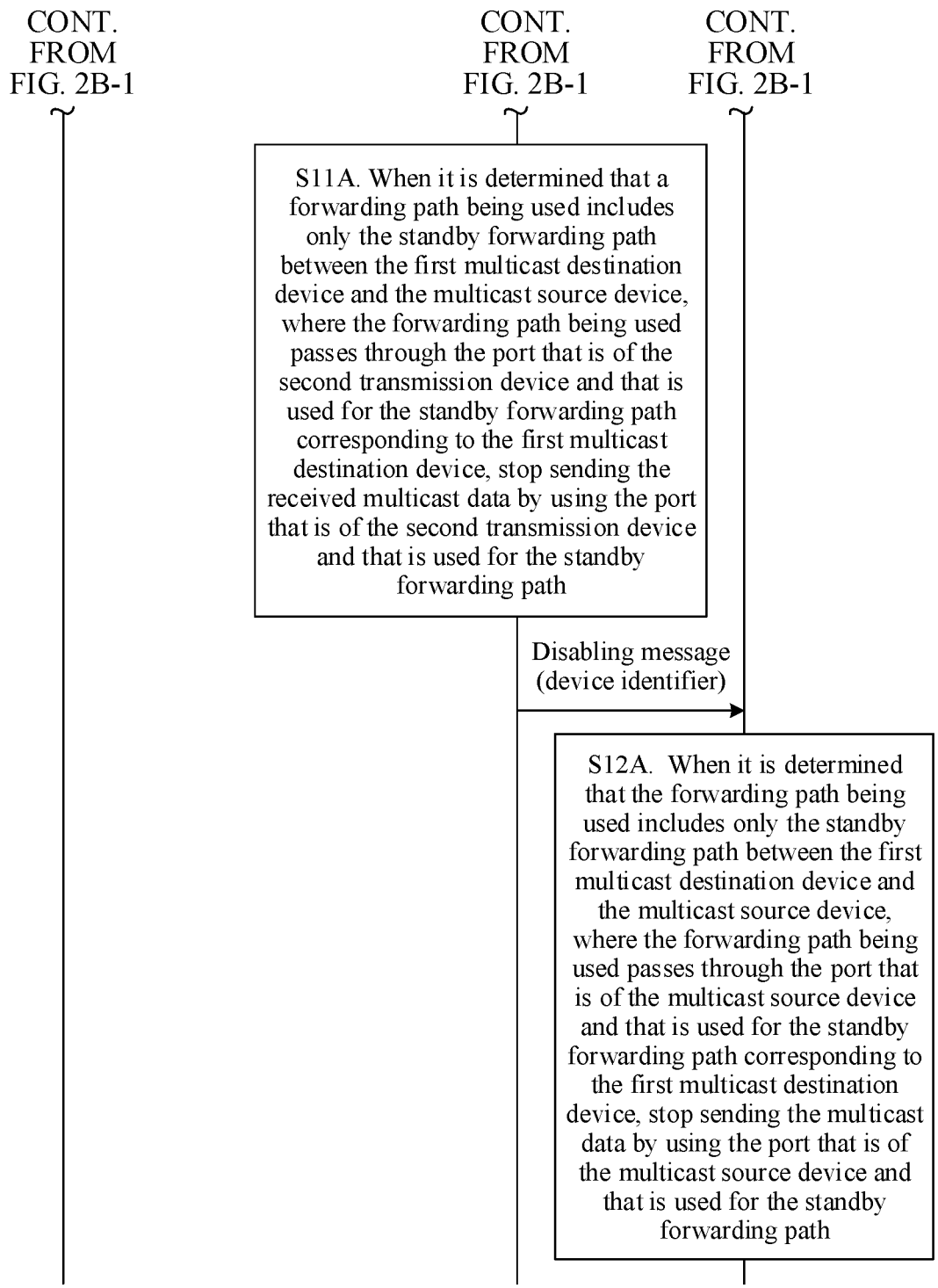
Figure 2C:
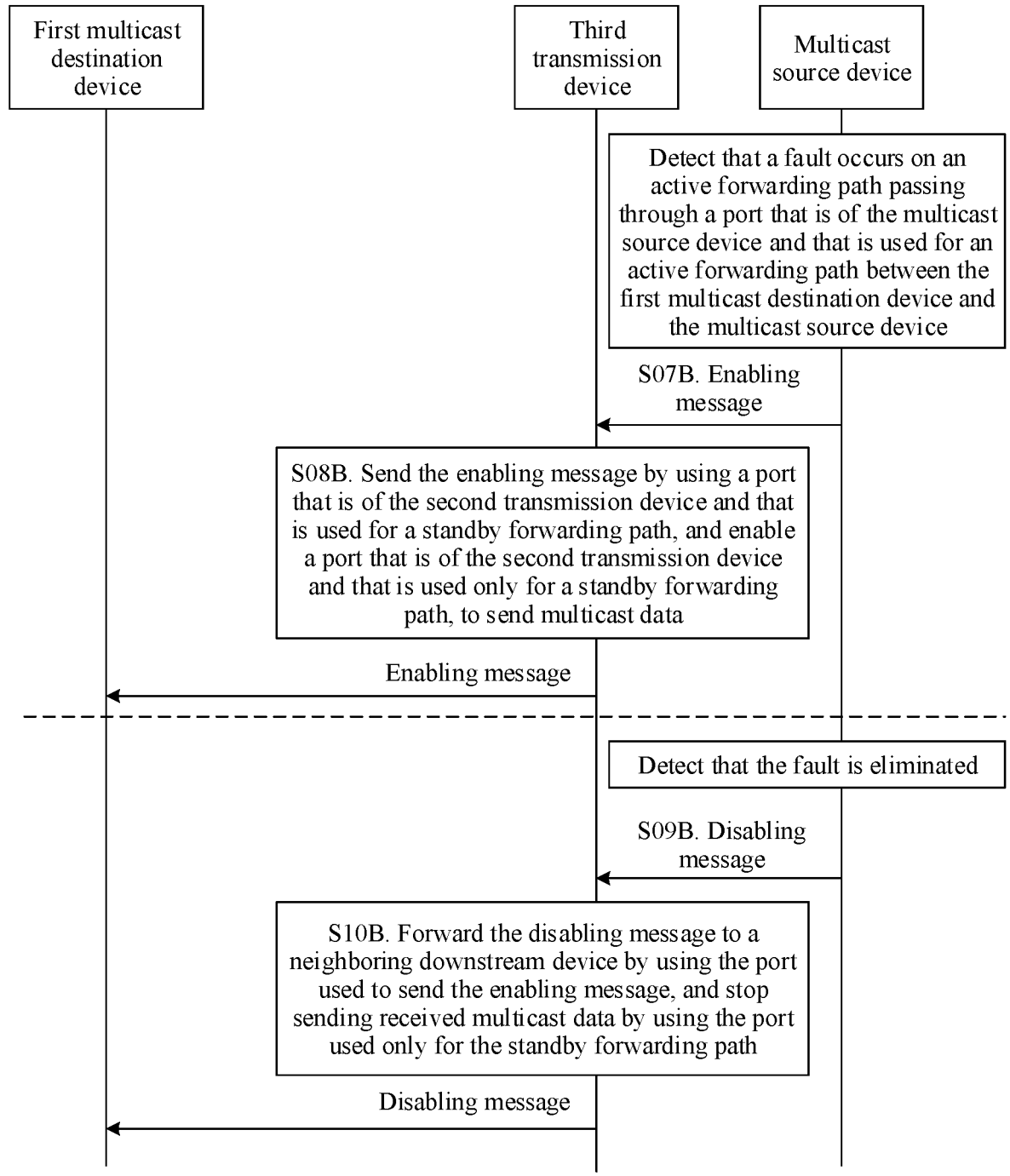

The following describes, with reference to FIG. 2A-1 to FIG. 2C, a method 100 provided in Embodiment 1 of the present invention. As shown in FIGS. 2A-1 and 2A-2 an active forwarding path between a first multicast destination device and a multicast source device is established by using steps S01 to S03, and a standby forwarding path between the first multicast destination device and the multicast source device is established by using steps S04 to S06. As shown in FIGS. 2B-1 and 2B-2, the multicast source device implements proactive enabling and disabling of the standby forwarding path by using steps S07A to S12A. As shown in FIG. 2C, the first multicast destination device implements proactive enabling and disabling of the standby forwarding path by using steps S07B-S10B.

As shown in FIGS. 2A-1 and 2A-2, the method 100 includes the following steps.

S01: The first multicast destination device (D1 shown in FIG. 1) sends an active forwarding path establishment request to a first neighboring upstream device (R31 shown in FIG. 1).

A destination address of the active forwarding path establishment request is an address of the multicast source device, for example, an internet protocol (IP) address of the multicast source device, to request to establish the active forwarding path between the first multicast destination device and the multicast source device. The address of the multicast source device may be pre-configured on the first multicast destination device. The first multicast destination device and each device that is located between the first multicast destination device and the multicast source device and through which the active forwarding path establishment request passes send the active forwarding path establishment request upstream until the active forwarding path establishment request reaches the multicast source device. For example, the active forwarding path establishment request may be sent upstream in a direction of a path with minimum overheads based on a shortest path first (SPF) algorithm. The active forwarding path establishment request further includes a device identifier. The device identifier is used to identify the first multicast destination device, and may be specifically an IP address of the first multicast destination device, or may be a character string, a serial number, or the like used to identify the first multicast destination device.

The active forwarding path establishment request may further include a multicast group identifier (for example, a multicast address) of multicast data that needs to be transmitted by using the active forwarding path. During specific implementation, before step S01, the multicast source device may obtain a multicast group identifier list from a data source device, and send the multicast group identifier list to each multicast destination device in a unicast manner. After obtaining the multicast group identifier list, the first multicast destination device performs step S01. The multicast group identifier in the active forwarding path establishment request includes one or more multicast group identifiers in the multicast group identifier list obtained by the first multicast destination device, for example, includes all multicast group identifiers in the multicast group identifier list obtained by the first multicast destination device.

It should be noted that the first multicast destination device and each transmission device that is located between the first multicast destination device and the multicast source device and through which the active forwarding path establishment request passes send the active forwarding path establishment request upstream until the active forwarding path establishment request reaches the multicast source device. Each device that is located between the first multicast destination device and the multicast source device and through which the active forwarding path establishment request passes performs subsequent step S02.

S02. When receiving the active forwarding path establishment request, any transmission device (subsequently referred to as a first transmission device) that is located between the first multicast destination device and the multicast source device and through which the active forwarding path establishment request passes uses the first transmission device as a device on the active forwarding path between the first multicast destination device and the multicast source device, records information used to indicate that the transmission device is located on the active forwarding path corresponding to the first device identifier, and forwards the active forwarding path establishment request.

An implementation of using the first transmission device as a device on the standby forwarding path between the first multicast destination device and the multicast source device may be: using a port that is of the first transmission device and that is used to receive the active forwarding path establishment request as a port used for the active forwarding path, that is, using the port as a port used to send the multicast data on the active forwarding path. Specifically, the first transmission device establishes an active forwarding entry based on the multicast group identifier in the active forwarding path establishment request, where the active forwarding entry includes a correspondence between a port number of the port and the multicast group identifier. It should be noted that before step S02, the first multicast destination device may have established the active forwarding entry when receiving, by using the port, an active forwarding path establishment request that includes the multicast group identifier and that is sent by another multicast destination device. Then, the active forwarding entry is retained in step S02.

After using the first transmission device as a device on the active forwarding path between the first multicast destination device and the multicast source device, when receiving the multicast data, the first transmission device can send the multicast data to a neighboring downstream device that sends the active forwarding path establishment request to the first transmission device. For example, when receiving the multicast data, the first transmission device sends the multicast data by using the port, for example, when receiving corresponding multicast data carrying the multicast group identifier (for example, receiving, when the multicast group identifier is a multicast address, the multicast data whose destination address is the multicast address), the first transmission device determines, by using the active forwarding entry, the port number corresponding to the multicast group identifier, and sends the multicast data by using the port corresponding to the port number.

S03: When receiving the active forwarding path establishment request, the multicast source device uses a port that is of the multicast source device and that is used to receive the active forwarding path establishment request as a port used for the active forwarding path between the first multicast destination device and the multicast source device, that is, uses the port as a port used to send the multicast data on the active forwarding path.

For example, the multicast source device establishes an active forwarding entry based on the multicast group identifier in the active forwarding path establishment request, where the active forwarding entry includes a correspondence between a port number of the port and the multicast group identifier. It should be noted that before step S03, the multicast source device may have established the active forwarding entry when receiving, by using the port, an active forwarding path establishment request that includes the multicast group identifier and that is sent by another multicast destination device. Then, the active forwarding entry is retained in step S03.

After using the port that is of the multicast source device and that is used to receive the active forwarding path establishment request as the port used for the active forwarding path, the multicast source device can send the multicast data by using the port when receiving the multicast data. For example, when receiving corresponding multicast data carrying the multicast group identifier, the multicast source device determines, by using the active forwarding entry, the port number corresponding to the multicast group identifier, and sends the multicast data by using the port corresponding to the port number.

In addition, the multicast source device may further record information used to indicate that the port is an active port corresponding to the device identifier.

S04. The first multicast destination device sends a standby forwarding path establishment request to a second neighboring upstream device (R32 shown in FIG. 1) different from the first neighboring upstream device.

The first multicast destination device may send the standby forwarding path establishment request when determining that the active forwarding path has been established. For example, after joining the active forwarding path, the multicast source device sends, to the first multicast destination device, a notification message used to indicate that the establishment succeeds, and after receiving the notification message, the first multicast destination device can determine that the active forwarding path is successfully established. The multicast source device may specifically send the notification message by using the active port corresponding to the device identifier. Correspondingly, all devices that have received the notification message and that are located between the multicast source device and the first multicast destination device send the notification message by using their respective active ports corresponding to the device identifier until the first multicast destination device receives the notification message. The first multicast destination device may also send the standby forwarding path establishment request after preset duration (for example, 200 ms) after sending the active forwarding path establishment request.

A destination address of the standby forwarding path establishment request is the address of the multicast source device, to request to establish the standby forwarding path between the first multicast destination device and the multicast source device. The standby forwarding path establishment request further includes the device identifier, and may further include the multicast group identifier.

The first multicast destination device and each device through which the standby forwarding path establishment request passes send the standby forwarding path establishment request to one or more neighboring upstream devices until the standby forwarding path establishment request reaches the multicast source device. Each transmission device through which the standby forwarding path establishment request passes performs subsequent step S05.

S05: When receiving the standby forwarding path establishment request, any transmission device (subsequently referred to as a second transmission device) that is located between the first multicast destination device and the multicast source device and through which the standby forwarding path establishment request passes determines, based on the device identifier in the standby forwarding path establishment request, whether the second transmission device has joined the active forwarding path between the first multicast destination device and the multicast source device; and if the second transmission device is located on the active forwarding path between the first multicast destination device and the multicast source device, the second transmission device does not use the second transmission device as a device on the standby forwarding path between the first multicast destination device and the multicast source device, does not forward the standby forwarding path establishment request, and in this case, may discard the standby forwarding path establishment request; or if the second transmission device is not located on the active forwarding path between the first multicast destination device and the multicast source device, the second transmission device uses the second transmission device as a device on the standby forwarding path between the first multicast destination device and the multicast source device, and forwards the standby forwarding path establishment request to a neighboring upstream device.

An implementation of using the second transmission device as a device on the standby forwarding path between the first multicast destination device and the multicast source device may be: using a port that is of the second transmission device and that is used to receive the standby forwarding path establishment request as a port used for the standby forwarding path, that is, using the port as a port used to send the multicast data on the standby forwarding path. Specifically, the second transmission device establishes a standby forwarding entry based on the multicast group identifier in the standby forwarding path establishment request, where the standby forwarding entry includes a correspondence between a port number of the port and the multicast group identifier.

It should be noted that before step 505, the first multicast destination device may have established the standby forwarding entry when receiving, by using the port, a standby forwarding path establishment request that includes the multicast group identifier and that is sent by another multicast destination device. Then, the standby forwarding entry is retained in step S05.

The second transmission device may further record information used to indicate that the port is a standby port corresponding to the device identifier.

It may be understood that if the second transmission device is located on the active forwarding path between the first multicast destination device and the multicast source device, the second transmission device is one first transmission device. If the second transmission device is not located on the active forwarding path between the first multicast destination device and the multicast source device, the second transmission device is a device different from any first transmission device.

S06: When receiving the standby forwarding path establishment request, the multicast source device uses a port that is of the multicast source device and that is used to receive the standby forwarding path establishment request as a port used for the standby forwarding path, that is, uses the port as a port used to send the multicast data on the standby forwarding path.

For example, the multicast source device may establish the standby forwarding entry based on the multicast group identifier in the standby forwarding path establishment request, where the standby forwarding entry includes a correspondence between a port number of the port and the multicast group identifier. It should be noted that before step S06, the multicast source device may have established the standby forwarding entry when receiving, by using the port, a standby forwarding path establishment request that includes the multicast group identifier and that is sent by another multicast destination device. Then, the standby forwarding entry is retained in step S06.

In addition, the multicast source device may further record information used to indicate that the port is a standby port corresponding to the device identifier, that is, record information used to indicate that the port is used for the standby forwarding path corresponding to the device identifier.

After step S06, the multicast source device may further send, by using the port used to receive the standby forwarding path establishment request, a success notification message used to indicate that the standby forwarding path of the multicast destination device is successfully established, where the success notification message includes the device identifier of the multicast destination device. Correspondingly, each second transmission device receiving the success notification message forwards the success notification message by using a standby port corresponding to the device identifier until the first multicast destination device receives the success notification message. A device (the second transmission device or the first multicast destination device) receiving the success notification message sent by the neighboring upstream device determines a port used to receive the success notification message as an enabling/disabling port of the standby forwarding path corresponding to the multicast destination device, and the enabling/disabling port of the standby forwarding path is used to send an enabling message used to indicate to enable the standby forwarding path between the multicast destination device and the multicast source device and a disabling message used to indicate to disable the standby forwarding path of the multicast destination device.

It should be noted that the first multicast destination device may have a plurality of other neighboring upstream devices different from the first neighboring upstream device, and the second transmission device may also have a plurality of neighboring upstream devices. During specific implementation, to ensure that the standby forwarding path is successfully established, one of the following two implementations may be used for implementation.

Implementation 1: When the first multicast destination device has a plurality of other neighboring upstream devices different from the first neighboring upstream device, the first multicast destination device sends the standby forwarding path establishment request to each of the other neighboring upstream devices. When the second transmission device has a plurality of neighboring upstream devices, the second transmission device also sends the standby forwarding path establishment request to each neighboring upstream device.

In this implementation, the multicast source device may receive a plurality of same standby forwarding path establishment requests from the first multicast destination device. The multicast source device may perform step S06 based on one of the standby forwarding path establishment requests, and further, the multicast source device may send the success notification message by using the port used to receive the standby forwarding path establishment request.

Implementation 2: When the first multicast destination device has a plurality of other neighboring upstream devices different from the first neighboring upstream device, the first multicast destination device first sends the standby forwarding path establishment request to one of the other neighboring upstream devices, and when receiving a failure notification message used to indicate that the establishment fails, sends the standby forwarding path establishment request to another neighboring upstream device until the success notification message is received. When the second transmission device has a plurality of neighboring upstream devices, the second transmission device also first sends the standby forwarding path establishment request to one of the neighboring upstream devices, and when receiving a failure notification message, sends the standby forwarding path establishment request to another neighboring upstream device until the success notification message is received or until the failure notification message is received for the standby forwarding path establishment request sent to each neighboring upstream device. A specific implementation is as follows: When receiving the standby forwarding path establishment request, the multicast source device sends the success notification message based on the port used to receive the standby forwarding path establishment request, and a device (the transmission device or the first multicast destination device) receiving the success notification message may determine, based on the success notification message, that the standby forwarding path is successfully established for the newly sent standby forwarding path establishment request, and does not need to send the standby forwarding path establishment request to another neighboring upstream device. If the transmission device receiving the standby forwarding path establishment request determines, by using step S05, that the transmission device has joined the active forwarding path of the first multicast destination device, the transmission device sends the failure notification message by using a port used to receive the standby forwarding path establishment request. If each device (the transmission device or the first multicast destination device) receiving the failure notification message has a neighboring upstream device to which no standby forwarding path establishment request is sent, the standby forwarding path establishment request is sent to the neighboring upstream device to which no standby forwarding path establishment request is sent, until the failure notification message is received for the standby forwarding path establishment request sent to each neighboring upstream device or until the success notification message is received for the standby forwarding path establishment request sent to one of the neighboring upstream devices. If the transmission device has received the failure notification message for the standby forwarding path establishment request sent to each neighboring upstream device, the transmission device sends the failure notification message by using the port used to receive the standby forwarding path establishment request.

The active forwarding path and the standby forwarding path between the first multicast destination device and the multicast source device are established by using the foregoing steps S01 to S06.

After the standby forwarding path is established, when detecting that a fault occurs on the active forwarding path, the first multicast destination device or the multicast source device may enable the standby forwarding path. The following describes, with reference to FIGS. 2B-1 and 2B-2 and by using steps S07A to S12A, a process in which the first multicast destination device enables the standby forwarding path, and describes, with reference to FIG. 2C and by using steps S07B to S12B, a process in which the multicast source device enables the standby forwarding path.

To implement the function of enabling, by the first multicast destination device, the standby forwarding path, before step S07A is performed, any transmission device located on the standby forwarding path and the first multicast destination device need to first determine, based on the foregoing steps, enabling/disabling ports of the standby forwarding path corresponding to the first multicast destination device that are on the transmission device and the first multicast destination device.

S07A: When detecting that a fault occurs on the active forwarding path, the first multicast destination device sends, by using the enabling/disabling port of the standby forwarding path on the first multicast destination device, the enabling message used to indicate to enable the standby forwarding path, where the enabling message includes the device identifier of the first multicast destination device.

The first multicast destination device may specifically detect, in a detection manner such as bidirectional forwarding detection (BFD), whether a fault occurs on the active forwarding path, and perform step S07A if a fault occurs.

S08A: After receiving the enabling message, any transmission device (subsequently referred to as a third transmission device) that is located on the standby forwarding path and that receives the enabling message sends received multicast data by using a port that is of the third transmission device and that is used for the standby forwarding path between the first multicast destination device and the multicast source device.

It may be understood that the third transmission device is the second transmission device located on the standby forwarding path between the first multicast destination device and the multicast source device.

The third transmission device may specifically send the received multicast data based on a standby forwarding entry that is of the third transmission device and that corresponds to the first multicast destination device.

The third transmission device may further send the enabling message to the neighboring upstream device by using the enabling/disabling port of the standby forwarding path corresponding to the device identifier. If the third transmission device has participated in multicast data transmission before receiving the enabling message, that is, the third transmission device is located on a path being used by another multicast destination device, for example, the third transmission device is located on an active forwarding path of another multicast destination device, or for another example, the third transmission device is located on a standby forwarding path of another multicast destination device and the standby forwarding path has been enabled, because the multicast data to be sent by the third transmission device to different multicast destination devices generally is the same, the third transmission device may directly send the received multicast data to the first multicast destination device, and does not necessarily need to forward the enabling message to the neighboring upstream device. Therefore, the third transmission device may forward the enabling message to the neighboring upstream device only when determining that the third transmission device has not participated in multicast data transmission before receiving the enabling message.

The enabling message is transmitted upstream by using enabling/disabling ports of the standby path until the enabling message reaches the third transmission device that has participated in multicast data transmission before receiving the enabling message, or until the enabling message reaches the multicast source device. The multicast source device performs step S09A if the multicast source device receives the enabling message.

S09A: After receiving the enabling message, the multicast source device sends the multicast data by using the port used for the standby forwarding path.

It may be understood that the port that is of the multicast source device and that is used for the standby forwarding path is a port that is of the multicast source device and that is used to receive the enabling message.

The multicast source device may send the multicast data based on the standby forwarding entry that is of the multicast source device and that corresponds to the first multicast destination device. Specifically, the multicast data may be sent based on the standby forwarding entry corresponding to the port used to receive the enabling message.

S10A: When detecting that the fault on the active forwarding path is eliminated, the first multicast destination device sends, by using the enabling/disabling port of the standby forwarding path, the disabling message used to indicate to disable the standby forwarding path, where the disabling message includes the device identifier of the first multicast destination device.

The first multicast destination device may detect, in a detection manner such as BFD, whether a fault occurs on the active forwarding path, and perform step S10A if the fault is eliminated.

S11A: After any transmission device (namely, the third transmission device) that is located on the standby forwarding path and that receives the disabling message receives the disabling message, when the third transmission device determines that a forwarding path being used includes only the standby forwarding path between the first multicast destination device and the multicast source device, where the forwarding path being used passes through the port that is of the third transmission device and that is used for the standby forwarding path between the first multicast destination device and the multicast source device, the third transmission device stops sending the received multicast data by using the port that is of the third transmission device and that is used for the standby forwarding path between the first multicast destination device and the multicast source device, for example, stops sending the multicast data based on the standby forwarding entry corresponding to the port.

The third transmission device may record an enabling record each time when receiving the enabling message, where the enabling record includes a correspondence between the device identifier in the enabling message and a port number of an enabled standby port, and delete the enabling record corresponding to the device identifier in the disabling message each time when receiving the disabling message.

When the disabling message is received in step S11A, if the enabling record of the port includes only the enabling record corresponding to the device identifier in the disabling message, it indicates that an enabled standby forwarding path passing through the port includes only the standby forwarding path between the first multicast destination device and the multicast source device, and if the port is not used for an active forwarding path of another multicast destination device, sending of the received multicast data by using the port that is of the third transmission device and that is used for the standby forwarding path between the first multicast destination device and the multicast source device may be stopped.

The third transmission device may further send the disabling message to the neighboring upstream device by using the enabling/disabling port of the standby forwarding path corresponding to the device identifier. If the third transmission device has sent the enabling message to the neighboring upstream device in the foregoing steps, the third transmission device sends the disabling message to the neighboring upstream device in step S11A.

The disabling message is transmitted upstream by using the enabling/disabling ports of the standby forwarding path until the disabling message reaches the third transmission device that has participated in multicast data transmission before receiving the enabling message, or until the disabling message reaches the multicast source device.

The multicast source device performs step S12A if the multicast source device receives the disabling message.

S12A: After receiving the disabling message, when determining that the forwarding path being used includes only the standby forwarding path between the first multicast destination device and the multicast source device, where the forwarding path being used passes through the port that is of the multicast source device and that is used for the standby forwarding path between the first multicast destination device and the multicast source device, the multicast source device stops sending the multicast data by using the port that is of the multicast source device and that is used for the standby forwarding path between the first multicast destination device and the multicast source device, for example, stops sending the multicast data based on the standby forwarding entry corresponding to the port.

An implementation of determining, by the multicast source device, that the forwarding path being used includes only the standby forwarding path between the first multicast destination device and the multicast source device, where the forwarding path being used passes through the port that is of the multicast source device and that is used for the standby forwarding path between the first multicast destination device and the multicast source device, is the same as an implementation of determining, by the third transmission device in step S11A, that the forwarding path being used includes only the standby forwarding path between the first multicast destination device and the multicast source device, where the forwarding path being used passes through the port that is of the third transmission device and that is used for the standby forwarding path between the first multicast destination device and the multicast source device. Details are not described again.

S07B: After the multicast source device detects that a fault occurs on an active forwarding path passing through the port that is of the multicast source device and that is used for the active forwarding path between the first multicast destination device and the multicast source device, the multicast source device sends, by using a port that is of the multicast source device and that is used for a standby forwarding path, the enabling message used to indicate to enable the standby forwarding path, where the port that is of the multicast source device and that is used for the standby forwarding path includes the port that is of the multicast source device and that is used for the standby forwarding path between the first multicast destination device and the multicast source device.

The port that is of the multicast source device and that is used for the standby forwarding path may be a port used only for a standby forwarding path, or may be a port used for both an active forwarding path and a standby forwarding path. After detecting the fault, the multicast source device may further enable the port that is of the multicast source device and that is used only for the standby forwarding path, to send the multicast data. For a port used for an active forwarding path (namely, a port used only for the active forwarding path and a port used for both the active forwarding path and a standby forwarding path), the multicast data is still sent by using the port.

In a first implementation, the multicast source device may send the enabling message by using all ports used for standby forwarding paths among ports other than the faulty port, and enable all ports used only for standby forwarding paths among the ports other than the faulty port, to send the multicast data.

In a second implementation, each time the multicast source device performs step S03, the multicast source device may record a device identifier corresponding to a case in which the port used to receive the active forwarding path establishment request is used as the active port; each time the multicast source device performs step S06, the multicast source device records a device identifier corresponding to a case in which the port used to receive the standby forwarding path establishment request is used as the standby port; and in step S07B, the multicast source device determines, based on a device identifier (there may be one or more device identifiers) corresponding to a case in which the faulty port is used as an active port, a standby port corresponding to the device identifier, sends, by using the determined standby port, an enabling message including the determined device identifier, and enables a port used only for the standby forwarding path in the determined standby port, send the multicast data.

The multicast source device may specifically detect, in a detection manner such as BFD, whether a fault occurs on the active forwarding path, and perform step S07B if a fault occurs.

S08B: After receiving the enabling message, any transmission device (namely, a third transmission device) that is located on the standby forwarding path and that receives the enabling message sends the enabling message by using a port that is of the third transmission device and that is used for a standby forwarding path.

The third transmission device may further enable a port that is of the third transmission device and that is used only for a standby forwarding path, to send the multicast data, for example, start to send the multicast data based on a standby forwarding entry corresponding to the port that is of the third transmission device and that is used only for the standby forwarding path.

In a first implementation corresponding to step S07B, the third transmission device may send the enabling message to all ports that are of the third transmission device and that are used for standby forwarding paths, and enable all ports that are of the third transmission device and that are used only for standby forwarding paths, to send the multicast data, for example, start to send the multicast data based on standby forwarding entries corresponding to all the ports that are of the third transmission device and that are used only for the standby forwarding paths.

In a second implementation corresponding to step S07B, the third transmission device may send the enabling message to the port that is of the third transmission device and that is used for the standby forwarding path corresponding to the device identifier in the enabling message, and enable a port used only for a standby forwarding path in the port that is of the third transmission device and that is used for the standby forwarding path corresponding to the device identifier in the enabling message, to send the multicast data, for example, start to send the multicast data based on a standby forwarding entry corresponding to the port used only for the standby forwarding path in the port that is of the third transmission device and that is used for the standby forwarding path corresponding to the device identifier in the enabling message.

The enabling message is transmitted downstream along standby ports until the enabling message reaches the first multicast destination device.

S09B: When detecting that the fault is eliminated, the multicast source device sends the disabling message by using the port used to send the enabling message.

The multicast source device further stops sending the multicast data by using the port used only for the standby forwarding path, for example, stops sending the multicast data based on the standby forwarding entry corresponding to the port used only for the standby forwarding path.

S10B: After receiving the disabling message, the third transmission device forwards the disabling message to a neighboring downstream device by using the port used to send the enabling message.

The third transmission device further stops sending the received multicast data by using the port used only for the standby forwarding path, for example, stops sending the multicast data based on the standby forwarding entry corresponding to the port used only for the standby forwarding path.

The enabling message is transmitted downstream along a standby port that is of each transmission device and that is used for the standby forwarding path until the enabling message reaches the first multicast destination device.

The embodiments of the present invention may be implemented based on a protocol independent multicast-sparse mode (PIM-SM) protocol. In an existing PIM protocol, if a value of a type field in a PIM message is 3, it indicates that the PIM message is a PIM JION message; if the value of the type field is 0, it indicates that the PIM message is a PIM Hello message; and a value of Type corresponding to a message type of another PIM message is one of 1 to 9. Both the active forwarding path establishment request and the standby forwarding path establishment request in the embodiments of the present invention may be implemented by extending a format of the PIM JOIN message, for example, the device identifier is added to a reserved field in a message header of the PIM JOIN message or a field is added to the end of the message header to carry the device identifier. For example, a character string or a serial number used to identify the multicast destination device is added to the reserved field. For another example, a field is added to the end of the message header to carry an IP address of the multicast destination device. In addition, the value of the type field in the PIM JOIN message may be set to 4, to indicate that the PIM JOIN message is the active forwarding path establishment request, and the value of the type field in the PIM JOIN message is modified to a value (for example, 10) different from values 1 to 9, to indicate that the PIM JOIN message is the standby forwarding path establishment request. In the embodiments of the present invention, all of the enabling message, the standby forwarding path disabling message, and the notification messages (for example, the success notification message and the failure notification message) may be implemented by extending a format of the Hello message. For example, the device identifier is added to a reserved field in a message header of the Hello message or a field is added to the end of the message header to carry the device identifier. In addition, a value of the type field in the Hello message is set to different values, to indicate that the Hello message has different functions. For example, the value of the type field in the Hello message is set to 11, to indicate that the Hello message is the enabling message, the value of the type field in the Hello message is set to 12, to indicate that the Hello message is the standby forwarding path disabling message, the value of the type field in the Hello message is set to 13, to indicate that the Hello message is the success notification message, and the value of the type field in the Hello message is set to 14, to indicate that the Hello message is the failure notification message. During PIM message transmission, a PIM message is usually encapsulated into an IP packet for transmission, that is, an IP header is encapsulated outside the PIM message. Correspondingly, the destination address in the active forwarding path establishment request and the standby forwarding path establishment request in the embodiments of the present invention is added to the IP header.

Figure 3:
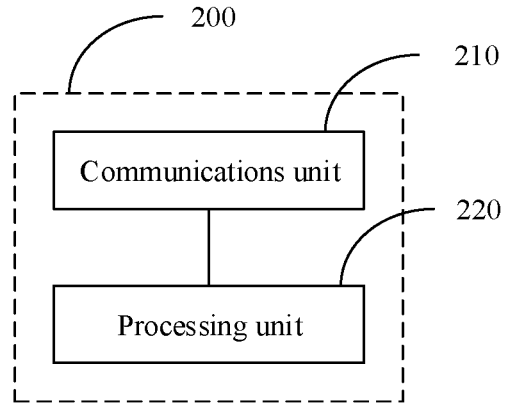
FIG. 3 is a schematic structural diagram of a transmission device according to Embodiment 2 of the present invention.

According to Embodiment 1 of the present invention, Embodiment 2 of the present invention provides a transmission device 200. As shown in FIG. 3, the transmission device 200 includes a communications unit 210 and a processing unit 220.

The communications unit 210 is configured to communicate with another device, for example, receive a standby forwarding path establishment request, an active forwarding path establishment request, multicast data, an enabling message, a disabling message, a notification message, and the like from another device, and send the standby forwarding path establishment request, the active forwarding path establishment request, the multicast data, the enabling message, the disabling message, the notification message, and the like to another device.

The processing unit 220 is configured to implement operations performed by the transmission device (for example, the first transmission device, the second transmission device, or the third transmission device) in the method 100 provided in Embodiment 1 of the present invention.

According to the transmission device 200 provided in Embodiment 2 of the present invention, when a fault occurs on the transmission device 200, the transmission device 200 affects only an active forwarding path of the multicast destination device, but does not affect a standby forwarding path of the multicast destination device, thereby improving reliability of multicast data transmission.

Figure 4:
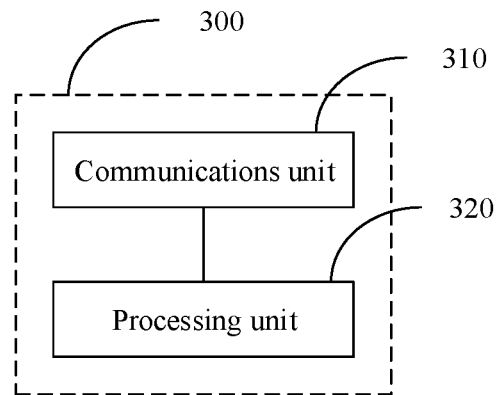
FIG. 4 is a schematic structural diagram of a multicast destination device according to Embodiment 3 of the present invention.

According to Embodiment 1 of the present invention, Embodiment 3 of the present invention provides a multicast destination device 300. As shown in FIG. 4, the multicast destination device 300 includes a communications unit 310 and a processing unit 320.

The communications unit 310 is configured to communicate with another device, for example, send a standby forwarding path establishment request, an active forwarding path establishment request, an enabling message, a disabling message, a notification message, and the like to another device, and receive multicast data, an enabling message, a disabling message, a notification message, and the like from another device.

The processing unit 220 is configured to implement operations performed by the first multicast destination device in the method 100 provided in Embodiment 1 of the present invention, for example, send an active forwarding path establishment request, a standby forwarding path establishment request, and the like by using the communications unit 310, and when receiving, by using the communications unit 310, a notification message used to indicate that a standby forwarding path of the multicast destination device 300 is successfully established, determine a port used to receive the notification message as an enabling/disabling port of the standby forwarding path.

According to the multicast destination device 300 provided in Embodiment 3 of the present invention, because the active forwarding path establishment request and the standby forwarding path establishment request are respectively sent to different neighboring upstream devices, and both the active forwarding path establishment request and the standby forwarding path establishment request include a device identifier of the multicast destination device 300, it can be effectively avoided that a same transmission device is located on both an active forwarding path of the multicast destination device 300 and the standby forwarding path of the multicast destination device 300, thereby improving reliability of multicast data transmission.

Figure 5:
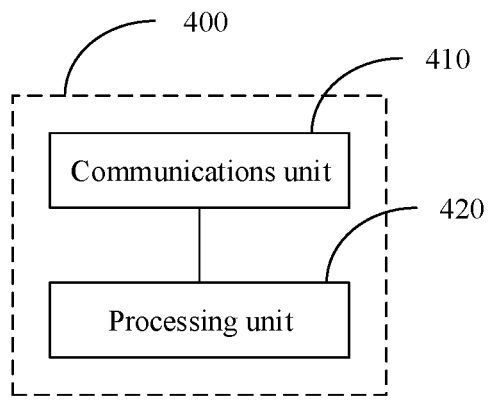
FIG. 5 is a schematic structural diagram of a multicast source device according to Embodiment 4 of the present invention.

According to Embodiment 1 of the present invention, Embodiment 4 of the present invention provides a multicast source device 400. As shown in FIG. 5, the multicast source device 400 includes a communications unit 410 and a processing unit 420.

The communications unit 410 is configured to communicate with another device, for example, send an enabling message, a disabling message, a notification message, and the like to another device, and receive a standby forwarding path establishment request, an active forwarding path establishment request, an enabling message, a disabling message, and the like from another device.

The processing unit 420 is configured to implement operations performed by the multicast source device in the method 100 provided in Embodiment 1 of the present invention.

According to the multicast source device 400 provided in Embodiment 4 of the present invention, a port that is of the multicast source device 400 and that is used for an active forwarding path of a multicast destination device and a port that is used for a standby forwarding path of the multicast destination device are different ports. Therefore, when a fault occurs the active forwarding path, multicast data may also be sent to the multicast destination device by using the port used for the standby forwarding path, thereby improving reliability of multicast data transmission.

Figure 6:
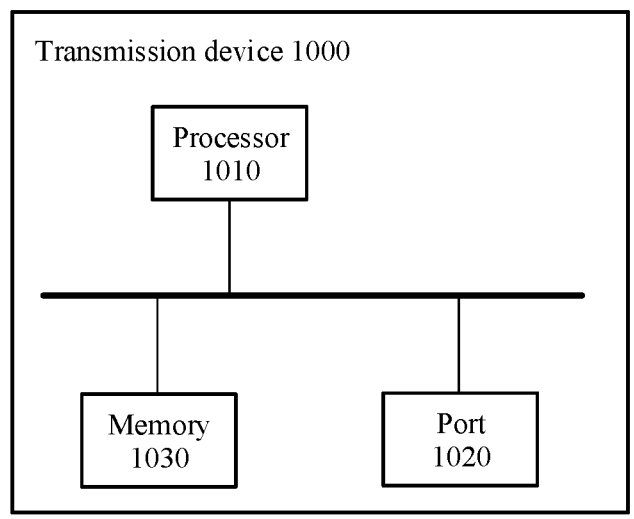
FIG. 6 is a schematic structural diagram of a transmission device according to Embodiment 5 of the present invention.

According to Embodiment 1 of the present invention, Embodiment 5 of the present invention provides a transmission device 1000. As shown in FIG. 6, the transmission device 1000 includes a processor 1010 and a port 1020.

The processor 1010 is configured to implement operations performed by the transmission device (for example, the first transmission device, the second transmission device, or the third transmission device) in the method 100 provided in Embodiment 1 of the present invention, where communication is performed with another device by using the port 1020. The processor 1010 may be specifically a central processing unit (CPU), or an application specific integrated circuit (ASIC), or one or more integrated circuits configured to implement this embodiment of the present invention.

As shown in FIG. 6, the transmission device 1000 may further include a memory 1030. The processor 1010 and the memory 1030 may communicate with each other by using a bus. The memory 1030 is configured to store a computer operation instruction, and may be specifically a high-speed random access memory (RAM), or may be a non-volatile memory. The processor 1010 may specifically execute the computer operation instruction stored in the memory 1030. The computer operation instruction is executed, to enable the transmission device 1000 to perform the operations performed by the transmission device in the method described in Embodiment 1.

According to the transmission device 1000 provided in Embodiment 5 of the present invention, when a fault occurs on the transmission device 1000, the transmission device 200 affects only an active forwarding path of the multicast destination device, but does not affect a standby forwarding path of the multicast destination device, thereby improving reliability of multicast data transmission.

Figure 7:
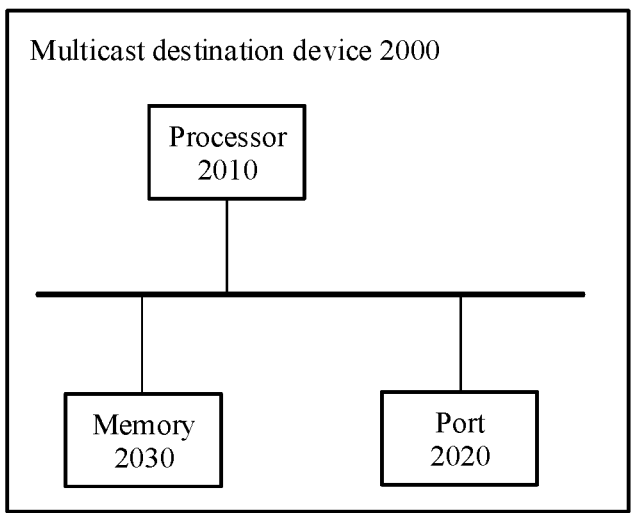
FIG. 7 is a schematic structural diagram of a multicast destination device according to Embodiment 6 of the present invention.

According to Embodiment 1 of the present invention, Embodiment 6 of the present invention provides a multicast destination device 2000. As shown in FIG. 7, the transmission device 1000 includes a processor 2010 and a port 2020.

The processor 2010 is configured to perform operations performed by the multicast destination device in the method 100 provided in Embodiment 1 of the present invention, where communication is performed with another device by using the port 2020. The processor 2010 may be specifically a CPU, or an application specific integrated circuit ASIC, or one or more integrated circuits configured to implement this embodiment of the present invention.

As shown in FIG. 7, the multicast destination device 2000 may further include a memory 2030. The processor 2010 and the memory 2030 may communicate with each other by using a bus. The memory 2030 is configured to store a computer operation instruction, and may be specifically a high-speed RAM memory, or may be a non-volatile memory. The processor 2010 may specifically execute the computer operation instruction stored in the memory 2030. The computer operation instruction is executed, to enable the multicast destination device 2000 to perform the operations performed by the multicast destination device in the method described in Embodiment 1.

According to the multicast destination device 2000 provided in Embodiment 6 of the present invention, because an active forwarding path establishment request and a standby forwarding path establishment request are respectively sent to different neighboring upstream devices, and both the active forwarding path establishment request and the standby forwarding path establishment request include a device identifier of the multicast destination device 2000, it can be effectively avoided that a same transmission device is located on both an active forwarding path of the multicast destination device 2000 and a standby forwarding path of the multicast destination device 2000, thereby improving reliability of multicast data transmission.

Figure 8:
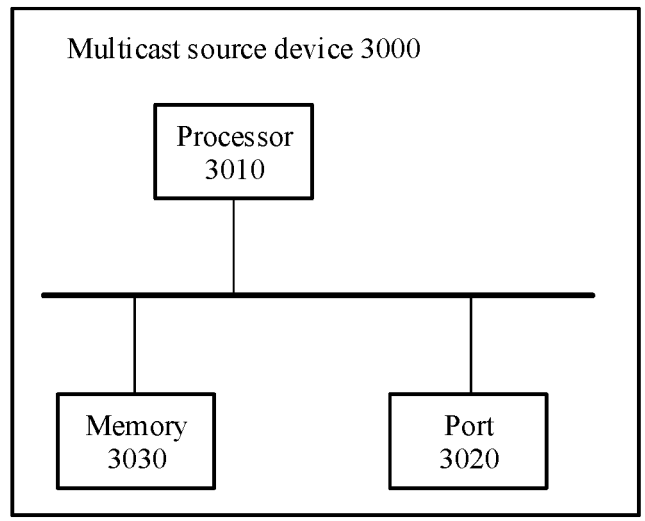
FIG. 8 is a schematic structural diagram of a multicast source device according to Embodiment 7 of the present invention.

According to Embodiment 1 of the present invention, Embodiment 7 of the present invention provides a multicast source device 3000. As shown in FIG. 8, the transmission device 1000 includes a processor 3010 and a port 3020.

The processor 3010 is configured to perform operations performed by the multicast source device in the method 100 provided in Embodiment 1 of the present invention, where communication is performed with another device by using the port 3020. The processor 3010 may be specifically a CPU, or an application specific integrated circuit ASIC, or one or more integrated circuits configured to implement this embodiment of the present invention.

As shown in FIG. 8, the multicast source device 3000 may further include a memory 3030. The processor 3010 and the memory 3030 may communicate with each other by using a bus. The memory 3030 is configured to store a computer operation instruction, and may be specifically a high-speed RAM memory, or may be a non-volatile memory. The processor 3010 may specifically execute the computer operation instruction stored in the memory 3030. The computer operation instruction is executed, to enable the multicast source device 3000 to perform the operations performed by the multicast source device in the method described in Embodiment 1.

According to the multicast source device 3000 provided in Embodiment 7 of the present invention, a port that is of the multicast source device 3000 and that is used for an active forwarding path of a multicast destination device and a port that is used for a standby forwarding path of the multicast destination device are different ports. Therefore, when a fault occurs on the active forwarding path, multicast data may also be sent to the multicast destination device by using the port used for the standby forwarding path, thereby improving reliability of multicast data transmission.

Figure 9:
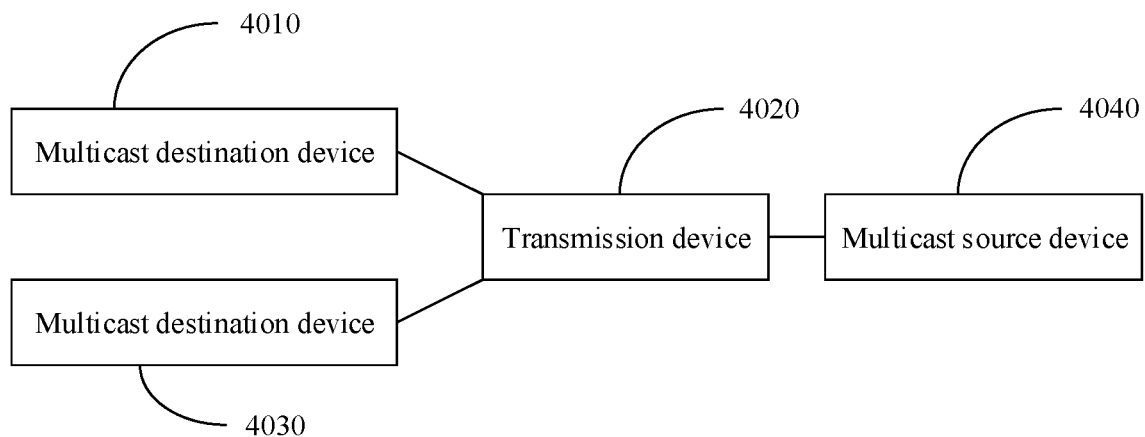
FIG. 9 is a schematic structural diagram of a system according to Embodiment 8 of the present invention.

According to Embodiment 1 of the present invention, Embodiment 8 of the present invention provides a data multicast implementation system 4000. As shown in FIG. 9, the system 4000 includes a multicast destination device 4010 and a transmission device 4020.

The multicast destination device 4010 is configured to send a first standby forwarding path establishment request to a neighboring upstream device of the multicast destination device 4010, where a destination address of the first standby forwarding path establishment request is an address of a multicast source device, to request to establish a standby forwarding path between the multicast destination device 4010 and the multicast source device, and the first standby forwarding path establishment request further includes a device identifier used to identify the multicast destination device 4010.

The transmission device 4020 is configured to receive the first standby forwarding path establishment request, and when it is determined, based on the device identifier in the first standby forwarding path establishment request, that the transmission device 4020 is located on an active forwarding path corresponding to the multicast destination device 4010, skip using the transmission device 4020 as a device on the standby forwarding path corresponding to the multicast destination device 4010, and skip forwarding the first standby forwarding path establishment request.

As shown in FIG. 9, the system 4000 may further include a multicast destination device 4030.

The multicast destination device 4030 is configured to send a second standby forwarding path establishment request to a neighboring upstream device of the multicast destination device 4030, where a destination address of the second standby forwarding path establishment request is the address of the multicast source device, to request to establish a standby forwarding path between the multicast destination device 4030 and the multicast source device, and the second standby forwarding path establishment request further includes a device identifier used to identify the multicast destination device 4030.

The transmission device 4020 is configured to receive the second standby forwarding path establishment request, and when it is determined, based on the device identifier in the second standby forwarding path establishment request, that the transmission device 4020 is not located on an active forwarding path corresponding to the multicast destination device 4030, use the transmission device 4020 as a device on the standby forwarding path corresponding to the multicast destination device 4030, and send the second standby forwarding path establishment request to a neighboring upstream device.

As shown in FIG. 9, the system 4000 may further include a multicast source device 4040. The multicast source device 4040 is configured to: when receiving the second standby forwarding path establishment request, use a port used to receive the second standby forwarding path establishment request as a port used for the standby forwarding path corresponding to the multicast destination device 4030.

The multicast destination device 4010 and the multicast destination device 4030 may perform operations performed by the first multicast destination device in the method described in Embodiment 1. The transmission device 4020 may perform operations performed by the first transmission device and the second transmission device in the method described in Embodiment 1. The multicast source device 4040 may perform operations performed by the multicast source device in the method described in Embodiment 1.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer network element (which may be a personal computer, a server, or a network element) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data multicast implementation method, wherein the method comprises:
   receiving, by a transmission device, a first standby forwarding path establishment request, wherein the first standby forwarding path establishment request comprises a first device identifier, and a destination address indicating an address of a multicast source device, the destination address being for establishing a standby forwarding path between a first multicast destination device identified by the first device identifier and the multicast source device; and
   when determining, based on the first device identifier, that the transmission device is located on an active forwarding path between the first multicast destination device and the multicast source device, skipping, by the transmission device, using the transmission device as a device on the standby forwarding path, and skipping forwarding the first standby forwarding path establishment request.

2. The method according to claim 1, wherein
before receiving the first standby forwarding path establishment request, the method further comprises:
   receiving, by the transmission device, an active forwarding path establishment request, wherein the active forwarding path establishment request comprises the first device identifier, a destination address indicating the address of the multicast source device, the destination address being for requesting the multicast source device to establish an active forwarding path between the first multicast destination device and the multicast source device;
   using, by the transmission device, the transmission device as a device on the active forwarding path, recording information used to indicate that the transmission device is located on the active forwarding path corresponding to the first device identifier, and sending the active forwarding path establishment request to a neighboring upstream device; and, wherein determining, based on the first device identifier, that the transmission device is located on the active forwarding path between the first multicast destination device and the multicast source device comprises:
   determine, based on the first device identifier in the first standby forwarding path establishment request and the recording information used to indicate that the transmission device is located on the active forwarding path corresponding to the first device identifier, that the transmission device is located on the active forwarding path.

3. The method according to claim 1, wherein the method further comprises:
   receiving, by the transmission device, a second standby forwarding path establishment request, wherein the second standby forwarding path establishment request comprises a second device identifier, a destination address indicating the address of the multicast source device, the destination address being for requesting to establish a standby forwarding path between a second multicast destination device identified by a second device identifier and the multicast source device; and
   when determining, based on the second device identifier, that the transmission device is not located on an active forwarding path between the second multicast destination device and the multicast source device, using, by the transmission device, the transmission device as a device on the standby forwarding path between the second multicast destination device and the multicast source device, and sending the second standby forwarding path establishment request to a neighboring upstream device.

4. The method according to claim 3, wherein the using the transmission device as a device on the standby forwarding path between the second multicast destination device and the multicast source device comprises: using, by the transmission device, a port that is of the transmission device and that is used to receive the second standby forwarding path establishment request as a port used for the standby forwarding path.

5. The method according to claim 4, wherein after sending the second standby forwarding path establishment request to the neighboring upstream device, the method further comprises:
   when receiving a notification message sent by the neighboring upstream device, the notification message comprising the second device identifier, and indicating that the standby forwarding path of the second multicast destination device is successfully established, determining, by the transmission device, a port to receive the notification message as an enabling/disabling port of the standby forwarding path corresponding to the second device identifier; and
   sending, by the transmission device, the notification message to a neighboring downstream device through a port that is of the transmission device and that is used for the standby forwarding path corresponding to the second device identifier, wherein the enabling/disabling port of the standby forwarding path is used to send an enabling message used to indicate to enable the standby forwarding path between the second multicast destination device and the multicast source device and a disabling message used to indicate to disable the standby forwarding path of the second multicast destination device.

6. The method according to claim 5, wherein after determining the port used to receive the notification message as an enabling/disabling port of the standby forwarding path corresponding to the second device identifier, the method further comprises:
   receiving, by the transmission device, an enabling message sent by the neighboring downstream device, wherein the enabling message comprises the second device identifier;

sending, by the transmission device, based on the enabling message, received multicast data through a port that is of the transmission device and used for the standby forwarding path between the second multicast destination device and the multicast source device; and sending, by the transmission device, the enabling message to the neighboring upstream device through the enabling/disabling port of the standby forwarding path corresponding to the second device identifier.

7. The method according to claim 5, wherein after sending the enabling message, the method further comprises:

receiving, by the transmission device, a disabling message sent by the neighboring downstream device, wherein the disabling message comprises the second device identifier;

stopping, by the transmission device based on the disabling message, sending received multicast data through the port that is of the transmission device and used for the standby forwarding path between the second multicast destination device and the multicast source device; and sending, by the transmission device, the disabling message to the neighboring upstream device through the enabling/disabling port of the standby forwarding path corresponding to the second device identifier.

8. The method according to claim 4, wherein after sending the standby forwarding path establishment request to the neighboring upstream device, the method further comprises:

when receiving an enabling message indicating to enable the standby forwarding path, the enabling message being sent by the neighboring upstream device, sending, by the transmission device, the enabling message through the port that is of the transmission device and that is used for the standby forwarding path.

9. The method according to claim 8, wherein when receiving the enable message, the transmission device further enables a port that is of the transmission device and that is used only for the standby forwarding path, to send received multicast data.

10. A transmission device for implementing data multicast, wherein the transmission device comprises:

a processor; and a non-transitory computer readable medium which contains computer-executable instructions;

the processor is configured to execute the computer-executable instructions to enable the transmission device to perform operations comprising:

receiving a first standby forwarding path establishment request, wherein the first standby forwarding path establishment request comprises a first device identifier, and a destination address indicating an address of a multicast source device, the destination address being for requesting to establish a standby forwarding path between a first multicast destination device identified by the first device identifier and the multicast source device; and when determining, based on the first device identifier, that the transmission device is located on an active forwarding path between the first multicast destination device and the multicast source device, skipping using the transmission device as a device on the standby forwarding path between the first multicast destination device and the multicast source device, and skipping forwarding the first standby forwarding path establishment request.

11. The transmission device according to claim 10, wherein the processor is further configured to execute the computer-executable instructions to enable the transmission device to perform operations comprising:

receiving an active forwarding path establishment request, wherein the active forwarding path establishment request comprises the first device identifier, and a destination address indicating the address of the multicast source device, the destination address being used to request the multicast source device to establish an active forwarding path between the first multicast destination device and the multicast source device;

using the transmission device as a device on the active forwarding path, recording information indicating that the transmission device is located on the active forwarding path corresponding to the first device identifier, and sending the active forwarding path establishment request to a neighboring upstream device; and, wherein determining, based on the first device identifier, that the transmission device is located on an active forwarding path between the first multicast destination device and the multicast source device comprises:

determine, based on the first device identifier in the first standby forwarding path establishment request and the recording information used to indicate that the transmission device is located on the active forwarding path corresponding to the first device identifier, that the transmission device is located on the active forwarding path.

12. The transmission device according to claim 10, wherein the processor is further configured to execute the computer-executable instructions to enable the transmission device to perform operations comprising:

receiving a second standby forwarding path establishment request, wherein the second standby forwarding path establishment request comprises a second device identifier, and a destination address indicating the address of the multicast source device, the destination address being for requesting to establish a standby forwarding path between a second multicast destination device identified by a second device identifier and the multicast source device; and when determining, based on the second device identifier, that the transmission device is not located on an active forwarding path between the second multicast destination device and the multicast source device, using the transmission device as a device on the standby forwarding path between the second multicast destination device and the multicast source device, and sending the second standby forwarding path establishment request to a neighboring upstream device.

13. A multicast destination device for implementing data multicast, wherein the multicast destination device comprises:

a processor; and a non-transitory computer readable medium which contains computer-executable instructions;

the processor is configured to execute the computer-executable instructions to enable the multicast destination device to perform operations comprising:

sending an active forwarding path establishment request to a first neighboring upstream device of the multicast destination device, wherein a destination address of the active forwarding path establishment request is an address of a multicast source device, and is for requesting to establish an active forwarding path between the multicast destination device and the multicast source device, and the active forwarding path establishment request further comprises a device identifier identifying the multicast destination device, wherein the device identifier is used by a device that is between the multicast source device and the multicast destination device and that joins the active forwarding path, to record information used to indicate that the device has joined the active forwarding path corresponding to the device identifier; and sending a standby forwarding path establishment request to a second neighboring upstream device that is of the multicast destination device and that is different from the first neighboring upstream device, wherein a destination address of the standby forwarding path establishment request is the address of the multicast source device, and is for requesting to establish a standby forwarding path between the multicast destination device and the multicast source device, and the standby forwarding path establishment request further comprises the device identifier, wherein the device identifier is used by a transmission device that is located between the multicast source device and the multicast destination device and that has received the standby forwarding path establishment request, to determine, based on the device identifier, whether the transmission device has joined the active forwarding path corresponding to the device identifier.

14. The multicast destination device according to claim 13, wherein the processor is further configured to execute the computer-executable instructions to enable the multicast destination device to perform operations comprising:

determining a port used to receive a notification message as an enabling/disabling port of the standby forwarding path, when receiving the notification message that is sent by the second neighboring upstream device and that is used to indicate that the standby forwarding path of the multicast destination device is successfully established; and sending an enabling message for indicating to enable the standby forwarding path through the enabling/disabling port of the standby forwarding path when a fault occurs on the active forwarding path.

15. The multicast destination device according to claim 14, wherein the processor is further configured to execute the computer-executable instructions to enable the multicast destination device to perform an operation comprising: when detecting that the fault on the active forwarding path is eliminated, sending, through the enabling/disabling port of the standby forwarding path, a disabling message indicating to disable the standby forwarding path.

16. A multicast source device for implementing data multicast, wherein the multicast source device comprises:

a processor; and a non-transitory computer readable medium which contains computer-executable instructions;

the processor is configured to execute the computer-executable instructions to enable the multicast source device to perform:

receiving an active forwarding path establishment request through a first port, wherein the active forwarding path establishment request comprises a device identifier and is for requesting the multicast source device to establish an active forwarding path between a multicast destination device identified by the device identifier and the multicast source device;

using the first port as a port used for the active forwarding path;

receiving a standby forwarding path establishment request through a second port, wherein the standby forwarding path establishment request comprises the device identifier and is for requesting the multicast source device to establish a standby forwarding path between the multicast destination device and the multicast source device; and using the second port as a port used for the standby forwarding path.

17. The device according to claim 16, wherein the processor is further configured to execute the computer-executable instructions to enable the multicast source device to perform: when receiving an enabling message that comprises the device identifier and indicates to enable the standby forwarding path between the multicast destination device and the multicast source device, sending, by the multicast source device, received multicast data through the second port based on the enabling message.

18. The device according to claim 17, wherein the processor is further configured to execute the computer-executable instructions to enable the multicast source device to perform: after detecting that a fault occurs on the active forwarding path passing through the first port, sending through a port that is of the multicast source device and that is used for the standby forwarding path, the enabling message indicating to enable the standby forwarding path; and, wherein the port that is of the multicast source device and that is used for the standby forwarding path comprises the second port.

19. The device according to claim 18, wherein the processor is further configured to execute the computer-executable instructions to enable the multicast source device to perform: after the detecting that a fault occurs on the active forwarding path passing through the first port, enabling the port that is of the multicast source device and that is used only for the standby forwarding path to send the multicast data.

20. The device according to claim 19, wherein the processor is further configured to execute the computer-executable instructions to enable the multicast source device to perform: after the sending the enabling message indicating to enable the standby forwarding path, when detecting that the fault on the active forwarding path is eliminated, sending, by the multicast destination device through the port that sends the enabling message, a disabling message indicating to disable the standby forwarding path, and stopping sending the multicast data through the port used only for the standby forwarding path.

* * * * *

UNITED STATES PATENT AND TRADEMARK OFFICE
CERTIFICATE OF CORRECTION

| | |
|---|---|
| PATENT NO. | : 11,582,053 B2 |
| APPLICATION NO. | : 17/137398 |
| DATED | : February 14, 2023 |
| INVENTOR(S) | : Nu Xia |

It is certified that error appears in the above-identified patent and that said Letters Patent is hereby corrected as shown below:

In the Specification

Column 20, Line 49, change "step 505" to --step S05--.

Signed and Sealed this
Fourteenth Day of March, 2023

Katherine Kelly Vidal
*Director of the United States Patent and Trademark Office*